United States Patent
Shin

(10) Patent No.: US 9,734,168 B1
(45) Date of Patent: Aug. 15, 2017

(54) METHOD AND SYSTEM FOR ORGANIZING DIGITAL FILES

(71) Applicant: Jennifer Shin, New York, NY (US)

(72) Inventor: Jennifer Shin, New York, NY (US)

(*) Notice: Subject to any disclaimer, the term of this patent is extended or adjusted under 35 U.S.C. 154(b) by 0 days.

(21) Appl. No.: 14/563,947

(22) Filed: Dec. 8, 2014

Related U.S. Application Data

(60) Provisional application No. 61/913,336, filed on Dec. 8, 2013.

(51) Int. Cl.
*G06K 9/54* (2006.01)
*G06K 9/60* (2006.01)
*G06F 17/30* (2006.01)

(52) U.S. Cl.
CPC .... *G06F 17/3028* (2013.01); *G06F 17/30268* (2013.01)

(58) Field of Classification Search
CPC .............. G06F 17/3028; G06F 17/30268
USPC .......................................... 382/306
See application file for complete search history.

(56) References Cited

U.S. PATENT DOCUMENTS

| | | | |
|---|---|---|---|
| 7,400,785 B2* | 7/2008 | Haas | G06F 17/30067 382/312 |
| 8,379,912 B2* | 2/2013 | Yadid | G06K 9/00664 382/100 |
| 2004/0230966 A1* | 11/2004 | Morris | G06F 17/30067 717/169 |
| 2005/0036042 A1* | 2/2005 | Haas | G06F 17/30067 348/231.3 |
| 2006/0008147 A1* | 1/2006 | Jung | G06K 9/2054 382/176 |
| 2012/0121195 A1* | 5/2012 | Yadid | G06K 9/00664 382/229 |

* cited by examiner

*Primary Examiner* — Feng Niu
(74) *Attorney, Agent, or Firm* — Lee & Lin IP PLLC; Jeong Eun Lee-Nago; Rita Lin

(57) ABSTRACT

A system for organizing digital files is provided, wherein tagging data is applied to a sequence of files. A tagging image having tagging data therein is preferably provided before or after the sequence, or both. A text recognizing technology may be used to extract the tagging data from a tagging image. For example, if a tagging image is taken on a camera prior to a sequence of images, the system may extract tagging data from the tagging image and apply such tagging data to the sequence of image files. Preferably, the system provides for renaming of the image files utilizing the tagging data.

16 Claims, 47 Drawing Sheets

FIG. 5A

| DEFAULT NAMING SCHEME | 'TAGGING IMAGE'? | TAGGING DATA IN 'TAGGING IMAGE' | 'TAGGING IMAGE' NAMING SCHEME |
|---|---|---|---|
| P1000487.JPG | YES | TEXT1 | TEXT1_1000487.JPG |
| P1000488.JPG | NO | | TEXT1_1000488.JPG |
| P1000489.JPG | NO | | TEXT1_1000489.JPG |
| P1000490.JPG | NO | | TEXT1_1000490.JPG |
| P1000491.JPG | YES | TEXT2 | TEXT2_1000491.JPG |
| P1000492.JPG | NO | | TEXT2_1000492.JPG |
| P1000493.JPG | NO | | TEXT2_1000493.JPG |
| P1000494.JPG | NO | | TEXT2_1000494.JPG |

FIG. 14A

| File Name | File Details | New File Name |
|---|---|---|
| File 1 | Notes | |
| File 2 | Notes | |
| File 3 | Notes | |

SUBMIT

FIG. 14B

| File Name | File Details | New File Name |
|---|---|---|
| File 1 | Notes | |
| File 2 | Notes | |
| File 3 | Notes | File Name Option 1 / File Name Option 2 / File Name Option 3 |

SUBMIT

FIG. 15A

| File Name | File Details | New File Name |
|---|---|---|
| File 1 | Notes | New File Name 1 |
| File 2 | Notes | New File Name 2 |
| File 3 | Notes | New File Name 3 |

PREVIEW

FIG. 15B

| File Name | File Details | New File Name |
|---|---|---|
| File 1 | Notes | New File Name 1 |
| File 2 | Notes | New File Name 2 |
| File 3 | Notes | New File Name 3 |

BACK    SUBMIT

FIG. 16A

| File Name | File Details | New File Name |
|---|---|---|
| File 1 | Notes | New File Name 1 |
| File 2 | Notes | |
| File 3 | Notes | New File Name 2 |

PREVIEW

FIG. 16B

| File Name | File Details | New File Name |
|---|---|---|
| File 1 | Notes | New File Name 1 - 1 |
| File 2 | Notes | New File Name 1 - 2 |
| File 3 | Notes | New File Name 2 - 1 |

Back    Submit

FIG. 16C

| File Name | File Details | New File Name |
|---|---|---|
| File 1 | Notes | New File Name 1 |
| File 2 | Notes | |
| File 3 | Notes | END |
| File 4 | Notes | |
| File 5 | Notes | New File Name 2 |
| File 6 | Notes | |

PREVIEW

FIG. 16D

| File Name | File Details | New File Name |
|---|---|---|
| File 1 | Notes | New File Name 1-1 |
| File 2 | Notes | New File Name 1-2 |
| File 3 | Notes | |
| File 4 | Notes | |
| File 5 | Notes | New File Name 2-1 |
| File 6 | Notes | New File Name 2-2 |

BACK     SUBMIT

Folder Options

Organize Images in New Folder

New File Name 1

New File Name 2

Create New File Folder

| Enter File Folder Name... | Select Images... |
| Enter File Folder Name... | Select Images... |
| Enter File Folder Name... | Select Images... |

+ Add More File Folders

[ BACK ]  [ SUBMIT ]

FIG. 18A

LOG

LOG SELECTION METHOD

Select..
ALL FILES
FOLDER
SEARCH

Include Existing Changes
Include All Changes

SUBMIT

FIG. 18B

LOG

FOLDER

Folder 1
Folder 2
Folder 3
Queue

SUBMIT

FIG. 18C

```
                          LOG
  SEARCH
       FIELD    [ Select...        v ]
       QUERY    [ Enter Text         ]

[ SUBMIT ]
```

FIG. 18D

```
                          LOG
  SEARCH
       FIELD 1   [ Select...   v ]   [ Enter Search Term... ]
       FIELD 2   [ Select...   v ]   [ Enter Search Term... ]

Update Date   [ from ]         [ to ]
       Upload Date   [ from ]         [ to ]

[ SUBMIT ]
```

FIG. 18E

| Original File Name | New File Name | Last Updated | File Location |
|---|---|---|---|
| Original File Name 1 | New File Name 1 | 01/01/2013 | Folder 1 |
| Original File Name 2 | New File Name 2 | 01/01/2014 | Folder 1 |
| Original File Name 3 | | | Queue |

LOG

FIG. 20A

File List

List Name    *Enter New List Name...*

Select Files

Select Folder...    Select Files...
Select Folder...    Select Files...

+ Add More File Folders

SUBMIT

FIG. 20B

*New List Name*

| File Name | List File Name | Description |
|---|---|---|
| File 1 | File A | |
| File 2 | File B | |
| File 3 | File C | |
| File 4 | File D | |
| File 5 | | |
| File 6 | | |

SUBMIT

FIG. 20C

| File Name | List File Name | Description |
|---|---|---|
| File 1 | File A | |
| File 2 | File B | |
| File 3 | File C | |
| File 4 | File D | |
| File 5 | File 5 | |
| File 6 | File 6 | |

*New List Name*

LIST PREVIEW    CREATE

FIG. 20D

```
                              New List Name

File Name            Description

File A

File B

File C

File D

File 5

File 6

[  EDIT  ]                    [  CREATE  ]
```

FIG. 20E

```
                                                    Viewer Interface

File Name            Description

File A

File B

File C

File D

File 5

File 6
```

FIG. 20F

New List Confirmation

Enable Public Access ☐

Create Login Account ☐ | Enter User Name... | | Enter Password... |

Link to Client Account ☐ | Select Client Account... ▾ |

Send Email | Enter Email Addresses... |

SUBMIT

METHOD AND SYSTEM FOR ORGANIZING DIGITAL FILES

CROSS REFERENCE TO RELATED APPLICATIONS

The application claims the benefit of U.S. Provisional Application No. 61/913,336, filed on Dec. 8, 2013, which is incorporated by reference herein in its entirety.

FIELD OF INVENTION

The invention is related to a system and method for cataloging digital images.

BACKGROUND OF THE INVENTION

The invention relates generally to a file organization system and method suitable for use in conjunction with digital cameras including digital still cameras, digital video cameras, mobile telephones having integrated digital cameras, and the like, and more particularly to a system and method for automatically creating meaningful filenames for digital files, such as digital image files. As digital cameras have become widely used, the demand on the user to retrieve and manage digital images has also increased. To retrieve and manage digital images, the user typically transfers image files stored in a camera to a computer, and renames or reorganizes each file based on categories, such as an event or date.

The user experience when transferring pictures from a digital camera to an external device, such as a personal computer, can be time consuming and tedious for several reasons. First, numerous steps are usually required to perform an image transfer including connecting the digital camera, initializing the computer, such as running a transfer application on the computer, choosing an album or destination directory for images, and renaming the files. This process becomes more difficult as the number of images captured and transferred to the computer increases. In particular, when multiple series of images are taken for different clients, scenes, objects, etc. before the images are uploaded to the computer, the process can be time consuming since a large number of images needs to be transferred and the transfer of images form a digital camera to an external device may not be consistent and the amount of time required may vary from session to session.

Presently, digital cameras typically employ a default file-naming scheme for identifying and tracking digital image files stored in memory or transferred to a digital image-processing device, such as a computer. Typically, a default file naming scheme is used, which employs a combination of letters and numbers, usually sequentially assigned to files stored in memory of the digital camera. For example, several common default naming schemes employ an identifier comprised of a series of letters (e.g. DSC, IMG, etc.), a sequential number (i.e. 0001, 0002, 0003, etc) that is appended to this identifier to separate one image file from another, and a file extension (i.e. JPG, TIFF, etc.) after the number to specify the file type.

These naming schemes typically do not provide information about the content in the digital image file and users have to view each image, one by one, to determine the contents of the file. This can be a time consuming and tedious process, especially for a series of images that are named using the same series of letters and combined with sequential numbering (i.e. DSC0001.jpg, DSC0002.jpg, etc.).

Furthermore, renaming files in a computer or other device may be cumbersome. Typically, the user must select and rename each file individually within the computer's file management program. The file management program may permit batch renaming, which requires each of the files to be renamed to be highlighted. However, one mis-click and the highlighted files may no longer be highlighted, or the order of file numbering may be different from what the user wants, etc.

Accordingly, it is desirable to provide an improved file organization system and method for cataloging digital images that overcomes drawbacks and inadequacies of known methods and systems.

SUMMARY OF THE INVENTIONS

Generally speaking, in accordance with an embodiment of the invention, an image processing system and method are provided for naming digital media files using data associated therewith via image and text recognition.

An embodiment of the system includes a processing device having a text recognition software for recognizing text in a digital image and extracting data from the text, then naming the subsequent image files based on the extracted data. Once a new image having text is recognized, data is extracted therefrom and the image files subsequent thereto are named according to the data extracted from the new image.

In accordance with one embodiment, the images from which text are to be recognized are identified automatically by a software on the imaging device or the computer or device to which the image files are to be transferred.

In accordance with one embodiment, the images from which text are to be recognized are identified manually by the user either on the imaging device or the computer or device to which the image files are to be transferred.

An embodiment of the invention is directed to a method of cataloging image files by providing one or more series of image files, the different series separated by image files having text. The image files with text are recognized, and the text recognized. Data is thus extracted from the image files with text. The image files subsequent to each image file with text but preceding the next image file with text are named or renamed using the data extracted from the appropriate image with text.

Hence, embodiments of the invention permit a user to associate meaningful information with an image to quickly and efficiently create annotated filenames for digital image files that convey meaningful information to the user (i.e. grouping images from an event by using the event name and using the same file name), which would then allow the user to classify and organize image files without opening, viewing, and manually renaming each individual file.

Another embodiment of the invention is directed to a system and method for naming a plurality of files wherein the user may enter the desired file name once per group of files, and the remaining files within the group are automatically named using the file name entered by the user.

An embodiment of the invention is directed to providing historical data regarding files, for example, previous file names and locations, dates on which the files were renamed, moved, etc. which are preferably searchable.

Still other objects and advantages of the invention will in part be obvious and will in part be apparent from the specification. Other features and advantages of this invention will become apparent in the following detailed description of exemplary embodiments of this invention with reference to the accompanying drawings.

BRIEF DESCRIPTION OF THE DRAWINGS

For a fuller understanding of the invention, reference is made to the following description taken in connection with the accompanying drawing, in which:

FIG. 5A is an illustration of an image naming scheme in accordance with an embodiment of the invention;

FIG. 14A is an illustration of an interface for renaming files in accordance with an embodiment of the invention;

FIG. 14B is an illustration of an interface for renaming files in accordance with an embodiment of the invention;

FIG. 15A is an illustration of an interface for renaming files in accordance with an embodiment of the invention;

FIG. 15B is an illustration of an interface for confirming the change of file names illustrated in FIG. 15A;

FIG. 16A is an illustration of an interface for confirming the change of file names illustrated in FIG. 16A;

FIG. 16B is an illustration of an interface for renaming files in accordance with an embodiment of the invention;

FIG. 16C is an illustration of an interface for renaming files in accordance with an embodiment of the invention;

FIG. 16D is an illustration of an interface for confirming the change of file names illustrated in FIG. 16C;

FIG. 16E is an illustration of an interface for viewing the files renamed in FIG. 16D;

FIG. 16F is an illustration of an interface for organizing files in accordance with the embodiment shown in FIG. 16C;

FIG. 18A is an illustration of an interface for searching historical data regarding files in accordance with an embodiment of the invention;

FIG. 18B is an illustration of an interface for searching historical data regarding files in accordance with an embodiment of the invention;

FIG. 18C is an illustration of an interface for searching historical data regarding files in accordance with an embodiment of the invention;

FIG. 18D is an illustration of an interface for searching historical data regarding files in accordance with an embodiment of the invention;

FIG. 18E is an illustration of an interface for viewing historical data regarding files in accordance with an embodiment of the invention;

FIG. 20A is an illustration of an interface for creating file lists in accordance with an embodiment of the invention;

FIG. 20B is an illustration of an interface for creating aliases for files in accordance with an embodiment of the invention;

FIG. 20C is an illustration of an interface for confirming aliases created in FIG. 20B;

FIG. 20D is an illustration of an interface for previewing the aliases created in FIG. 20B;

FIG. 20E is an illustration of an interface for accessing a list created in accordance with an embodiment of the invention;

FIG. 20F is an illustration of an interface for sharing a list created in accordance with an embodiment of the invention;

DETAILED DESCRIPTION OF THE PREFERRED EMBODIMENTS

Figure 1:
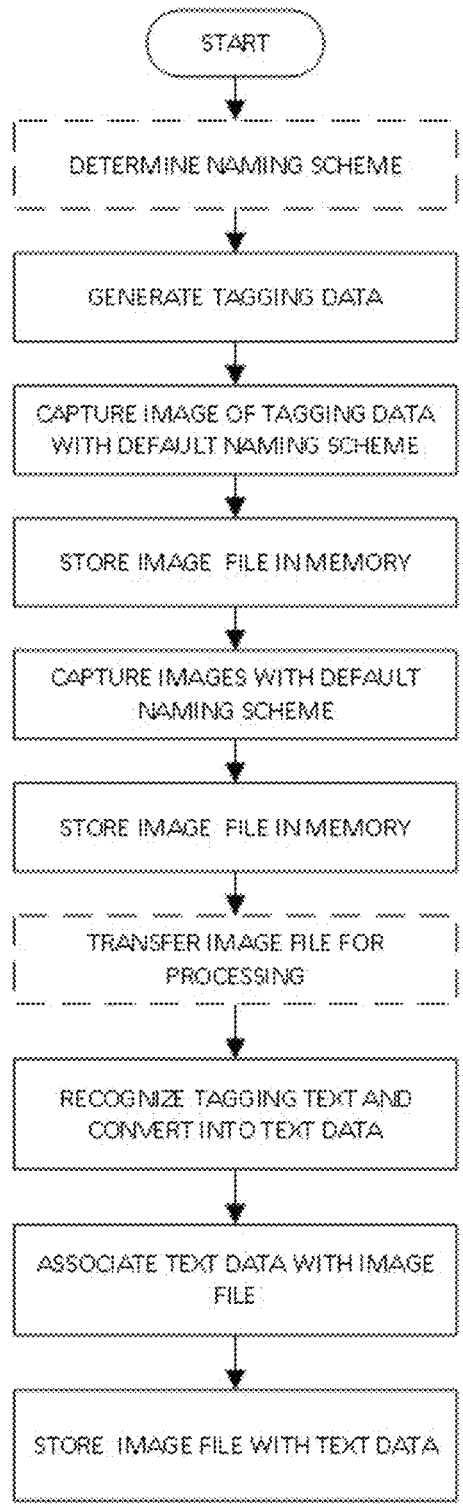
FIG. 1 is a flow chart illustrating a method of cataloging digital image files according to an exemplary embodiment of the invention.
Figure 2:
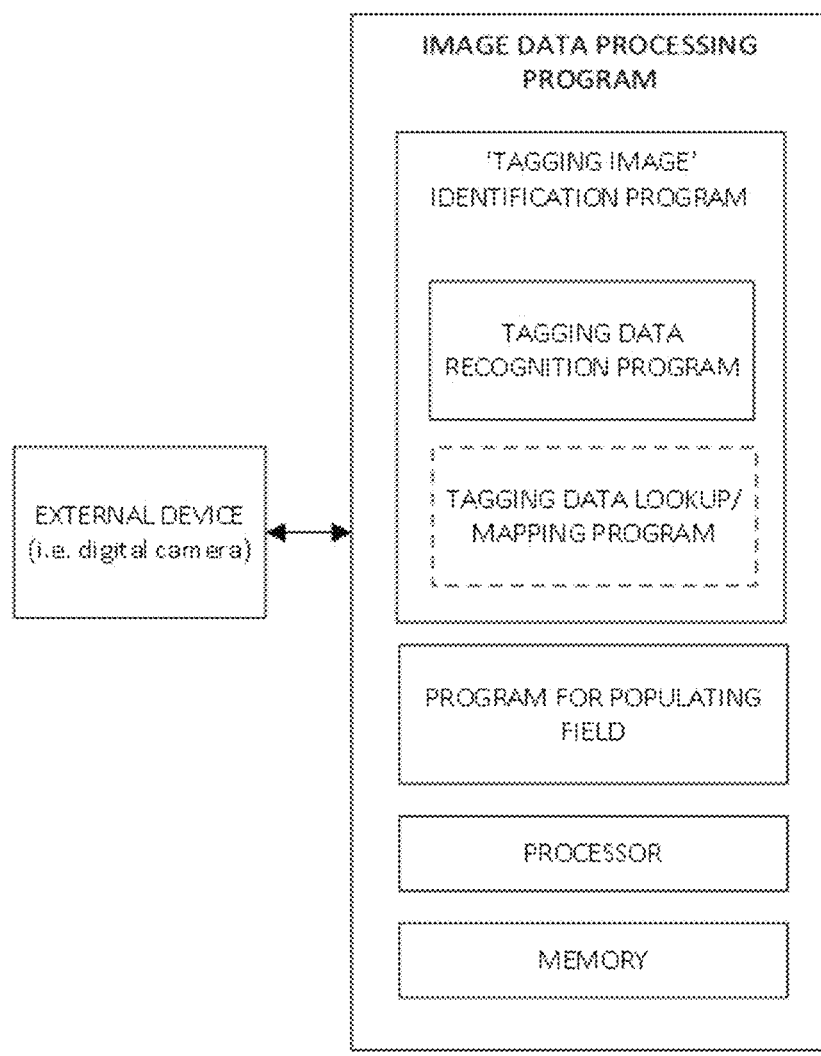
FIG. 2 is a block diagram of a part of a system in accordance with an embodiment of the present disclosure.
Figure 3A:
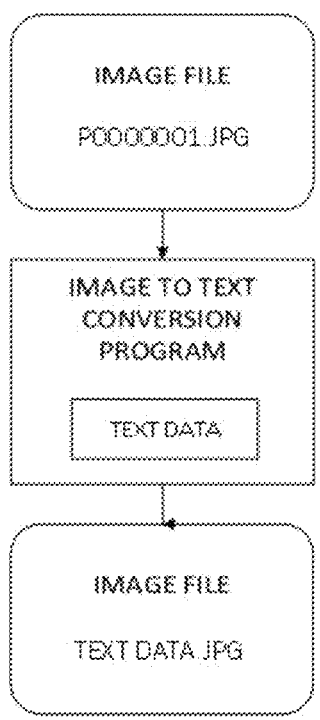
FIG. 3A is a block diagram of an annotated filename for a digital image file according to an embodiment of the invention.
Figure 3B:
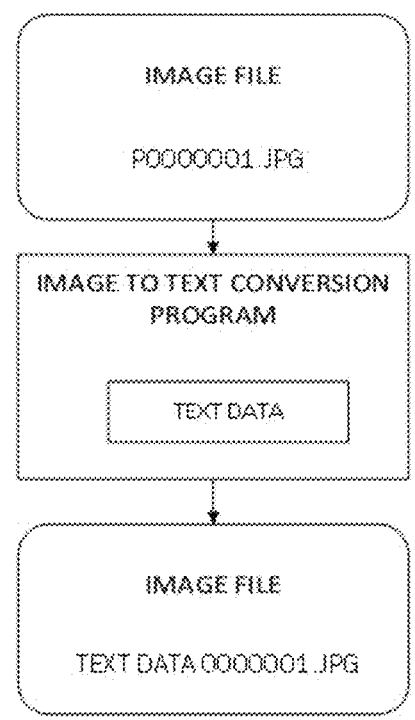
FIG. 3B is a block diagram of an annotated filename for a digital image file according to an embodiment of the invention.
Figure 4:
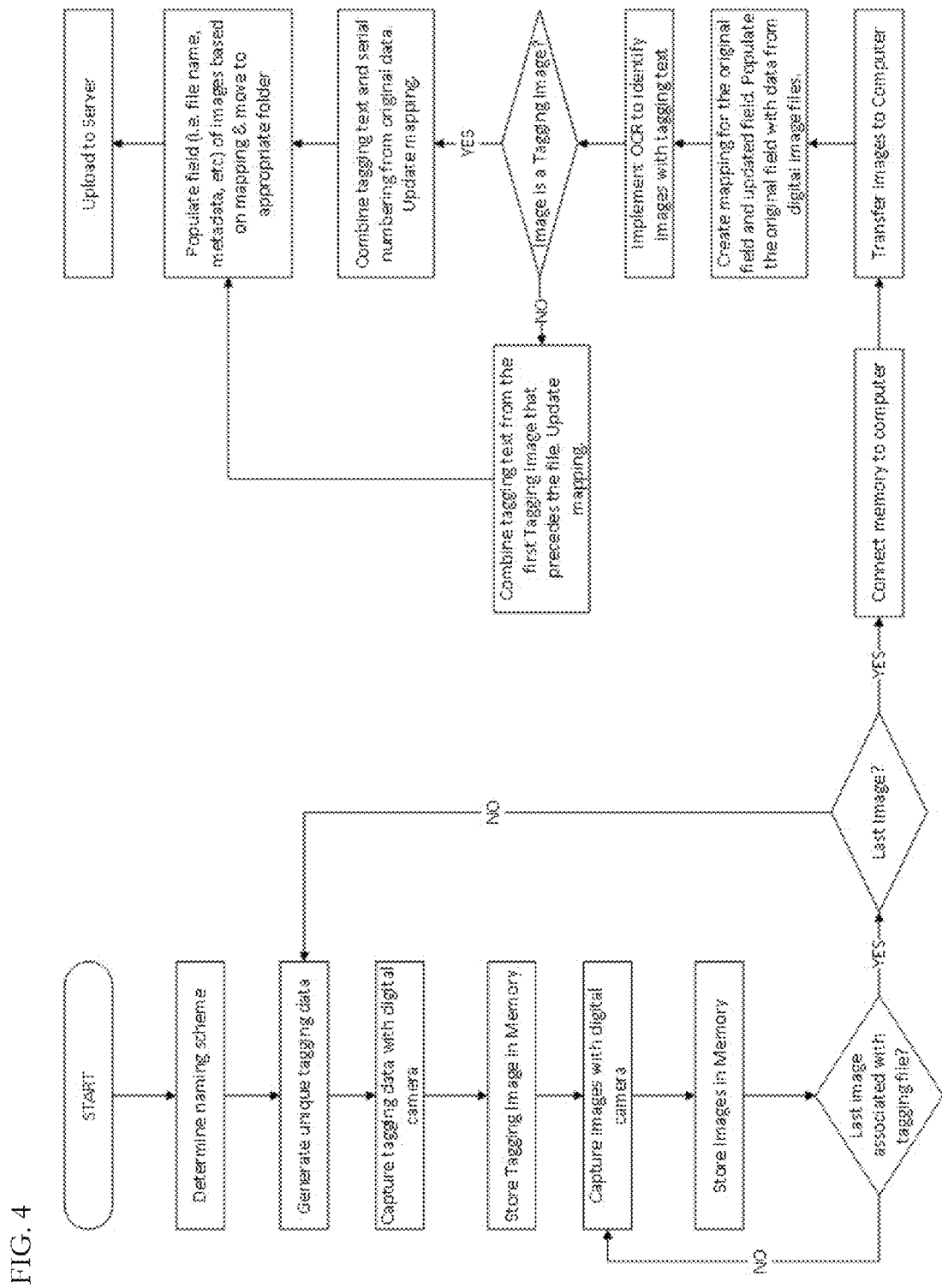
FIG. 4 is a flow chart illustrating a method for generating an annotated filename for a series of digital image files in accordance with an embodiment of the invention.

The invention generally is directed to a method and system for automating the organization and cataloging a series of images captured by an imaging device. "Imaging device" and "camera" as used herein refer generally to devices that can capture a still image and/or video, such as digital still cameras, digital video cameras, devices for converting analog images into digital images, webcams, scanners, telephones or other devices having a mechanism for taking photos and/or videos, and the like. "Digital image" and "image" as used herein refer to still images, scanned images, videos, slideshows or other compilation of still images or videos, and the like. "User" as used herein refers generally to users of the system and/or method, such as a professional or non-professional photographer; a person taking photographs, recording videos, scanning images or organizing image files; a person who connects a source of image files, whether it be physically, wirelessly, or by any other means for transferring image files, to a computer or other processing device, such as a tablet, phone or other mobile device, local or remote servers, (generally referred to herein as "processing device") or a storage medium; and a person who copies or transfers image files to a processing device or a storage medium. The invention is more particularly directed to a system, for example, an automated system, and method for organizing and cataloging digital image files.

A system and method are provided herein to facilitate cataloging and organizing digital images. An embodiment of the invention provides a method for cataloging digital image files by capturing data from a digital image file, referred to herein as a "Tagging Image." The Tagging Image may be a photograph taken of a document having information regarding the related images. For example, the photographer may write or type on a sheet of paper or other surface, the client's name, date, place, etc. of the images to be taken or already taken and take a photo of the information. Alternatively, if the imaging device can receive text input, the Tagging Image may be generated by the imaging device itself by having a user input the information into the imaging device. The Tagging image may then be identified and the data therein ("Tagging Data") extracted, for example, the client's name, date and place. The image files may be segregated in the imaging device, processing device or storage medium according to their position with respect to the Tagging Images.

By way of non-limiting example, all the images between two consecutive Tagging Images may be grouped into a single series of image files. The Tagging Data from the Tagging Image preceding the series preferably is used to name the image files within the series and associated with such image files. Alternatively, the Tagging Data of the Tagging Image succeeding the series may be used in lieu of or in combination with the Tagging Data of the Tagging Image preceding the series of images. In accordance with one embodiment of the invention, if there are no image files between two consecutive Tagging Images, the Tagging Data of the first Tagging Image is associated with the series of image files preceding the Tagging Image, and the Tagging Data of the second Tagging Image is associated with the series of image files succeeding the Tagging Images.

In accordance with an embodiment of the invention, when two Tagging Images are used for a common series of image files, the Tagging Image preceding the series of images is "an Opening Tagging Image" and the Tagging image succeeding the series of images is "a Closing Tagging Image." If the Tagging Data of the Closing Tagging Image includes only data not provided in the Opening Tagging Image, the data from the Closing Tagging Image will supplement the data of the Opening Tagging Image. Alternatively, if the Closing Tagging Image includes data for some of the same fields as the Opening Tagging Image, the Tagging Data of the Closing Tagging Image is preferably used in lieu of the conflicting Tagging Data of the Opening Tagging Image. Therefore, the user may correct errors or update information provided on the Opening Tagging Image by using a Closing Tagging Image.

By using Tagging Images throughout the process of capturing multiple images, the user may reduce the amount of time and effort required to catalog these image files. In addition, automating the process of cataloging said images may reduce the risk of incorrectly associating images with the incorrect client, event, date, etc. since the user need not rely on their memory or recollection, or what they were told by the person who took the photos or scanned the images. Automation may decrease the amount of time and effort necessary to deliver the captured images to a client, as well as increase the efficiency and speed of the services offered to their clients, so that clients can access the images and select images for services, such a retouching.

Tagging Image files preferably contain recognizable content, such as numbers, text, serial numbers, barcode, and/or QR code, which is generated to associate a series of digital images with data indicative of the content captured in the images.

Referring to FIGS. 1 to 13F, in accordance with an embodiment of the invention, prior to capturing an image or a series of images, the user captures the Tagging Image as a digital image, which is then stored in memory under an initial default naming scheme (i.e. DSC0001). The user subsequently captures one or more digital images using an imaging device, whereupon the images are associated with the Tagging Image and stored in memory under the default naming scheme (i.e. DSC0002, DSC0003, etc.). When capturing a new series of images, the user generates a new Tagging Image and captures the Tagging Image as a digital image, then captures a series of images to be associated with the Tagging Image, and stores all the images to memory using the default naming scheme.

The system may include a user interface via which the user may, using an inputting device, identify a Tagging Image, select set of image files to be associated with data from the Tagging Image, change file names, create a list of file names that correspond to certain files, or initiate an automated computer program for renaming the files. Examples of the inputting device include, but are not limited to, a keyboard, mouse, touch screen, stylus, and the like. The process of associating the Tagging Data from a Tagging Image with digital image files is preferably automated by using image or text recognition software to search for text data in a set of images, extracting Tagging Data from each Tagging Image, and adding this information to populate certain fields, for example, file names and meta data. The Tagging Image may be identified automatically upon connecting the source of image files to the processing device. Preferably, the Tagging Data is extracted and associated to the image files automatically as well. Alternatively, the user may initiate identifying Tagging Images and/or the subsequent steps.

Alternatively, the user may perform one or more of the steps directly. For example, the user may select the Tagging Image from which to extract Tagging Data, and/or also select a group of image files to which such Tagging Data is to be associated. The user may then initiate an automated process of associating the Tagging Data to the group of image files. As one of ordinary skill in the art would understand, any combination of automated, user initiated and user performed steps are contemplated and included.

Tagging Data preferably includes a unique identifier used to create new file or folder names, such as serial numbers or appointment information. This preferably reduces the computational time required to resolve certain situations, such as the use of Tagging Data that is already the name of a file or folder on the system. Tagging data may also include, but is not limited to, QR codes (Quick Response Codes), barcodes, and/or other representations of information that is recognizable in images.

An exemplary embodiment of the invention includes identifying Tagging Images and associating text data contained in each Tagging Image with one or more digital images, preferably the images which follow the subject Tagging Image and before the subsequent Tagging Image. The data extracted from the subsequent Tagging Image is preferably associated with the image files following the subsequent Tagging Image. Alternatively, an embodiment of the invention includes an automated system for naming one or more consecutive digital images based on the Tagging Data obtained from the Tagging Image immediately following the series of images.

In another embodiment of the invention, the cataloging of digital images includes generating one or more new file folder names based on Tagging Data obtained from Tagging Image(s), creating these new file folders, and transferring the image files into the respective folders. Namely, the images are transferred into the new file folder associated with the same Tagging Data as the images.

In accordance with an embodiment of the invention, the Tagging Data obtained from the Tagging Image is obtained by recognized text of the Tagging Image using optical character recognition (OCR). OCR refers to computer technology that involves reading text from an image and translating the images into a form that the computer can manipulate (for example, into ASCII codes).

Figure 5B:
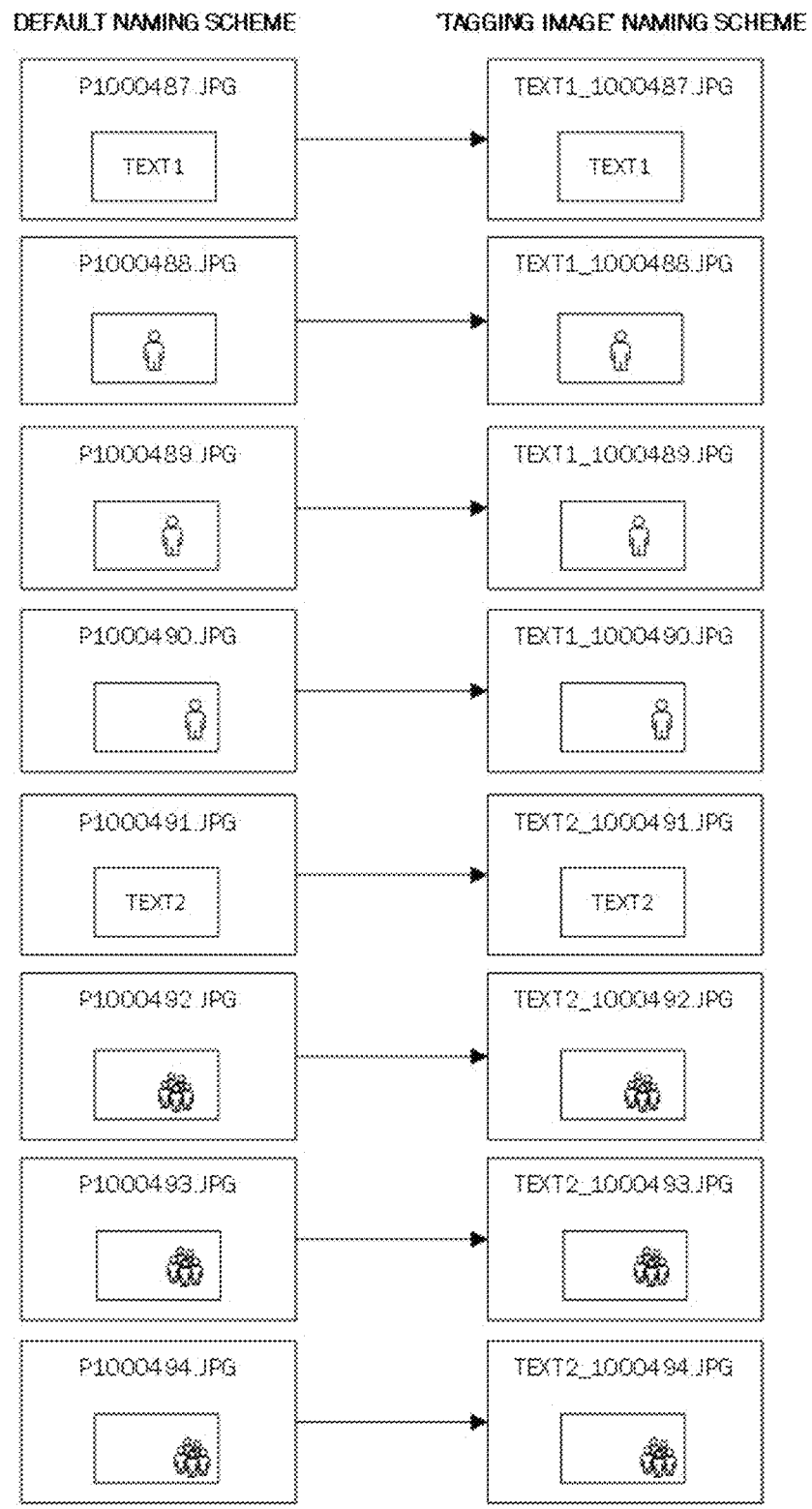
FIG. 5B is an illustration of the digital image files of FIG. 5A being renamed.
Figure 6:
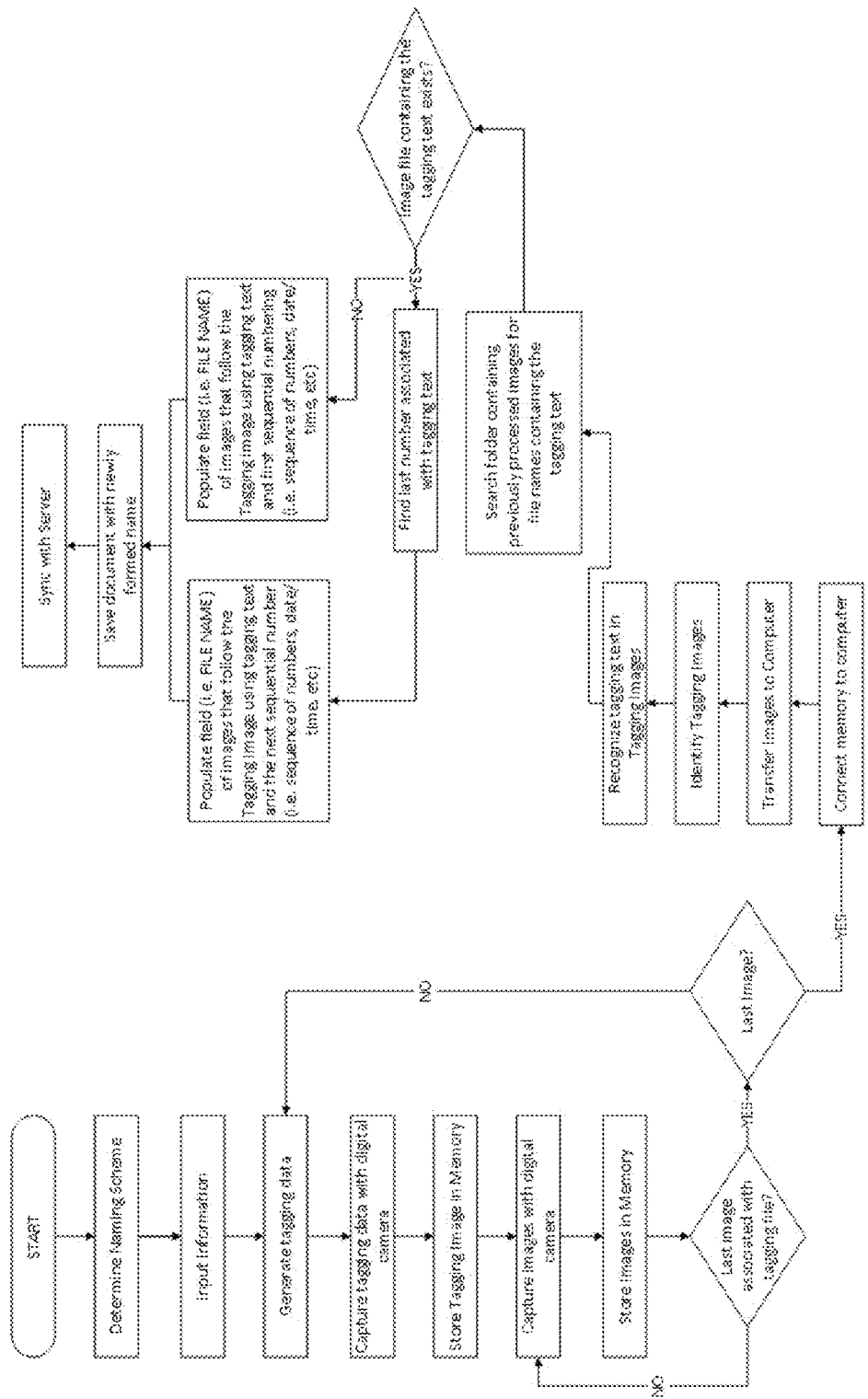
FIG. 6 is a flow chart illustrating a method for generating an annotated filename for a series of digital image files in accordance with an embodiment of the invention.
Figure 7:
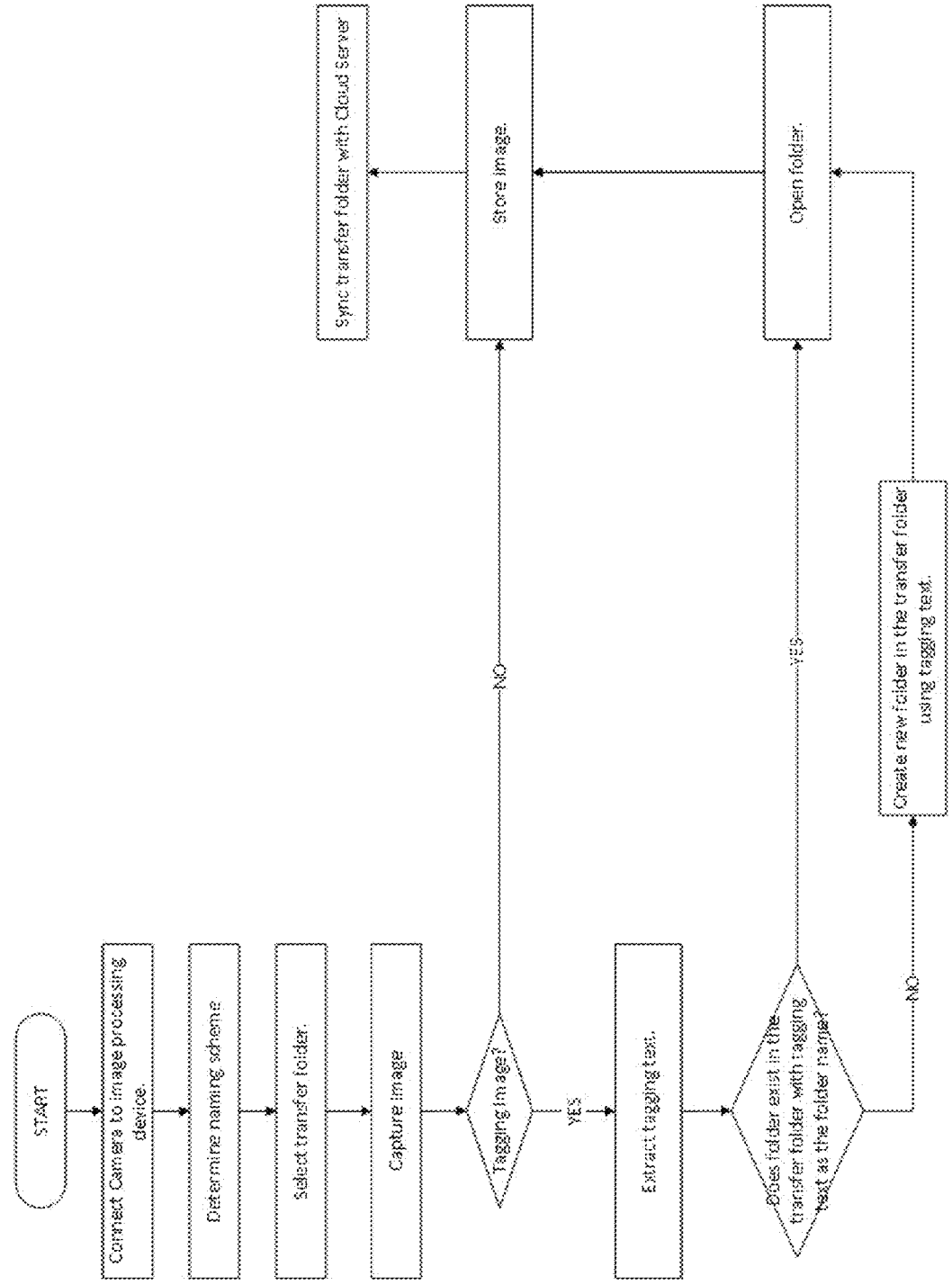
FIG. 7 is a flow chart illustrating a method for capturing and storing digital images in accordance with an embodiment of the invention.
Figure 8:
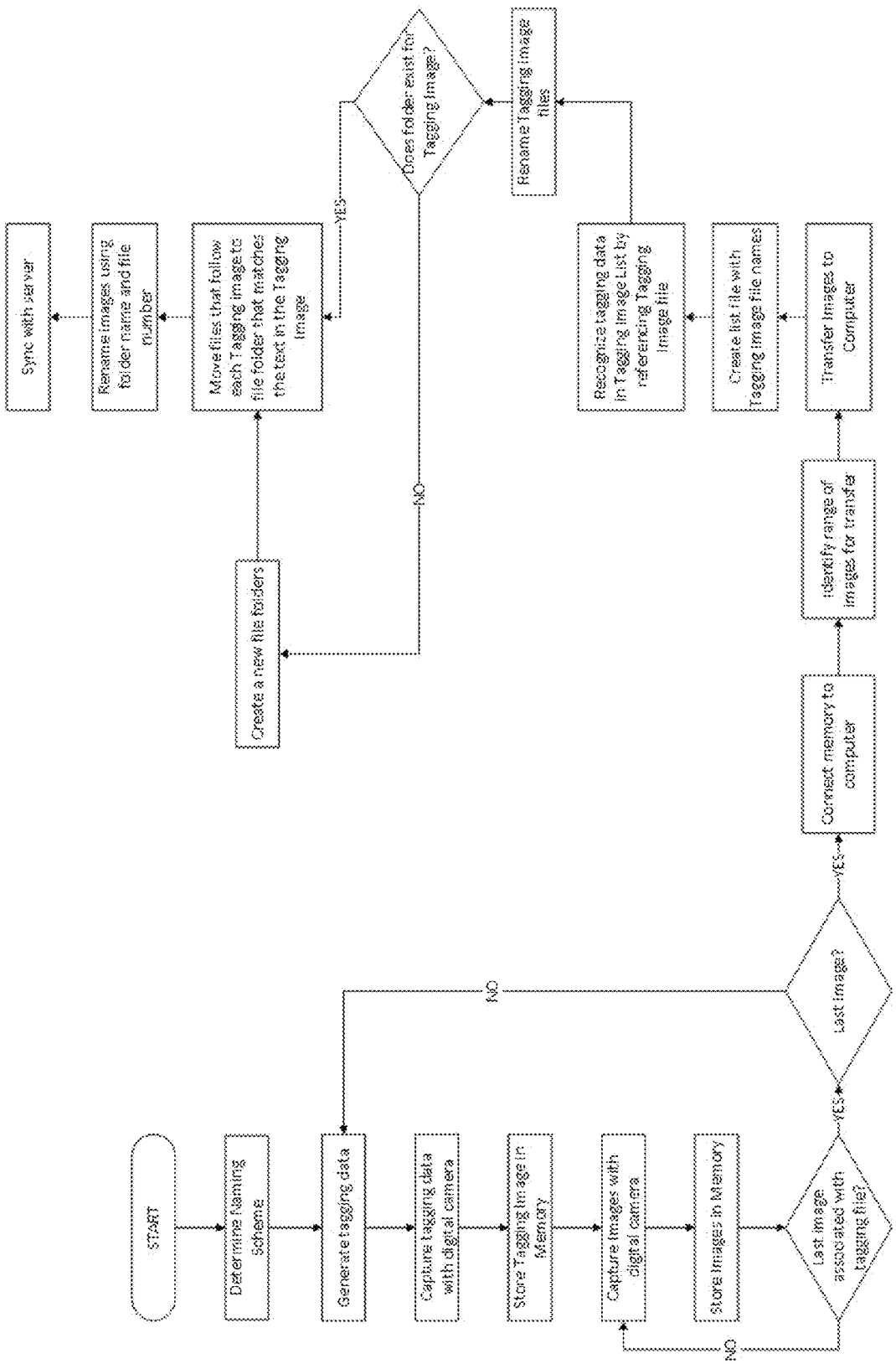
FIG. 8 is a flow chart illustrating a process for generating an annotated file and file folder names in accordance with an exemplary embodiment of the invention.
Figure 9:
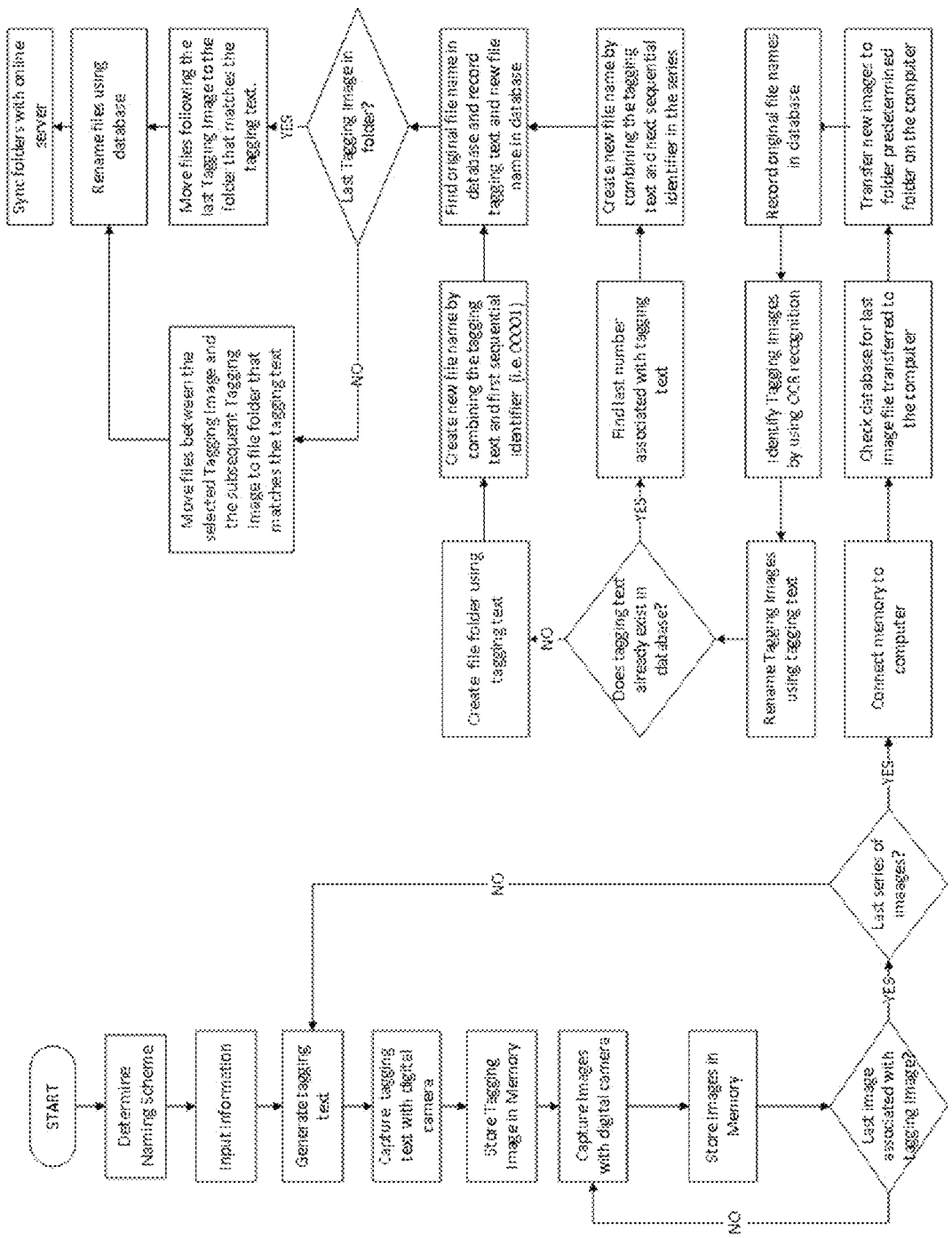
FIG. 9 is a flow chart illustrating a process for generating an annotated file name using a database in accordance with an embodiment of the invention.
Figure 10A:
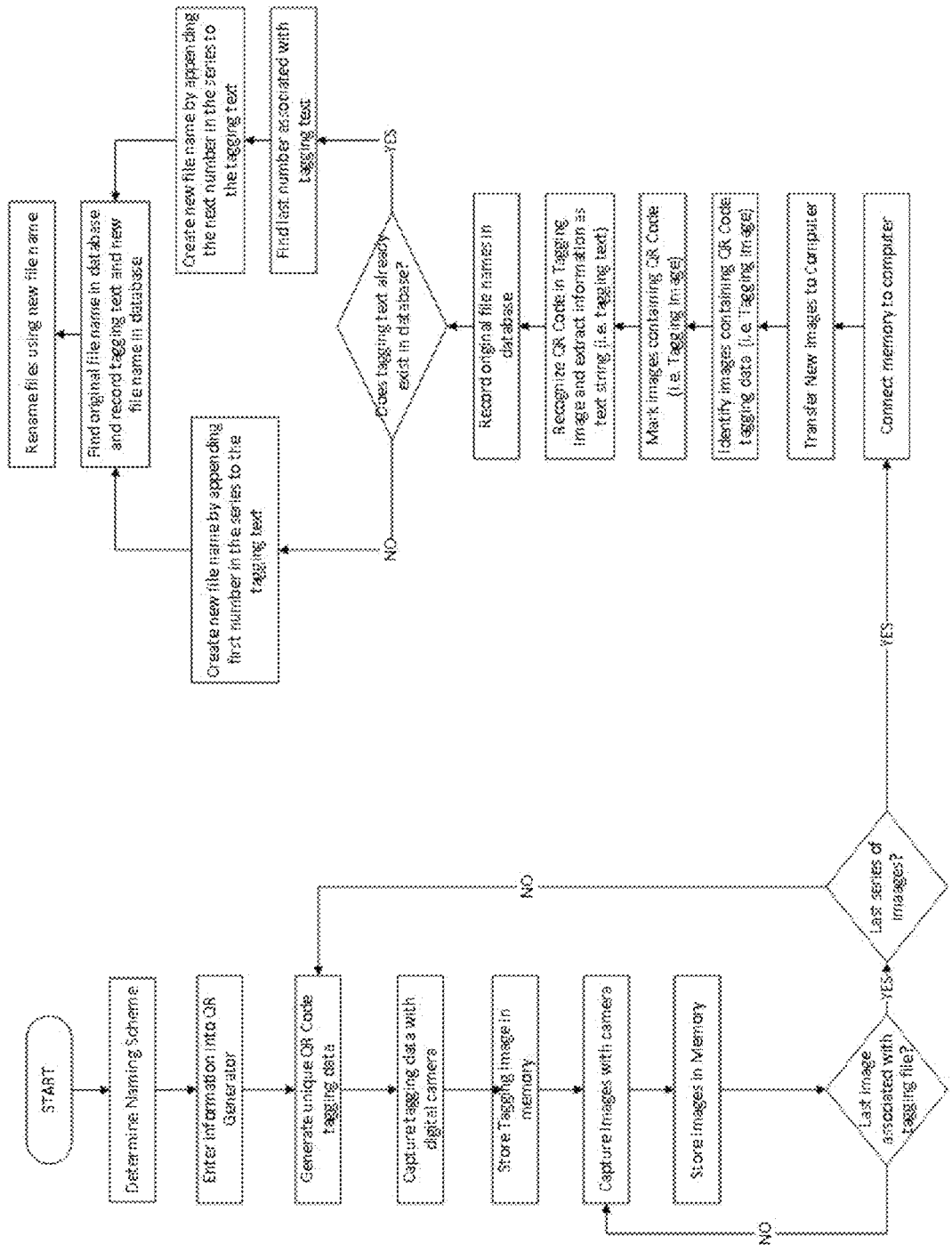
FIG. 10A is a flow chart illustrating a process for generating an annotated file name using a QR code in accordance with an embodiment of the invention.
Figure 10B:
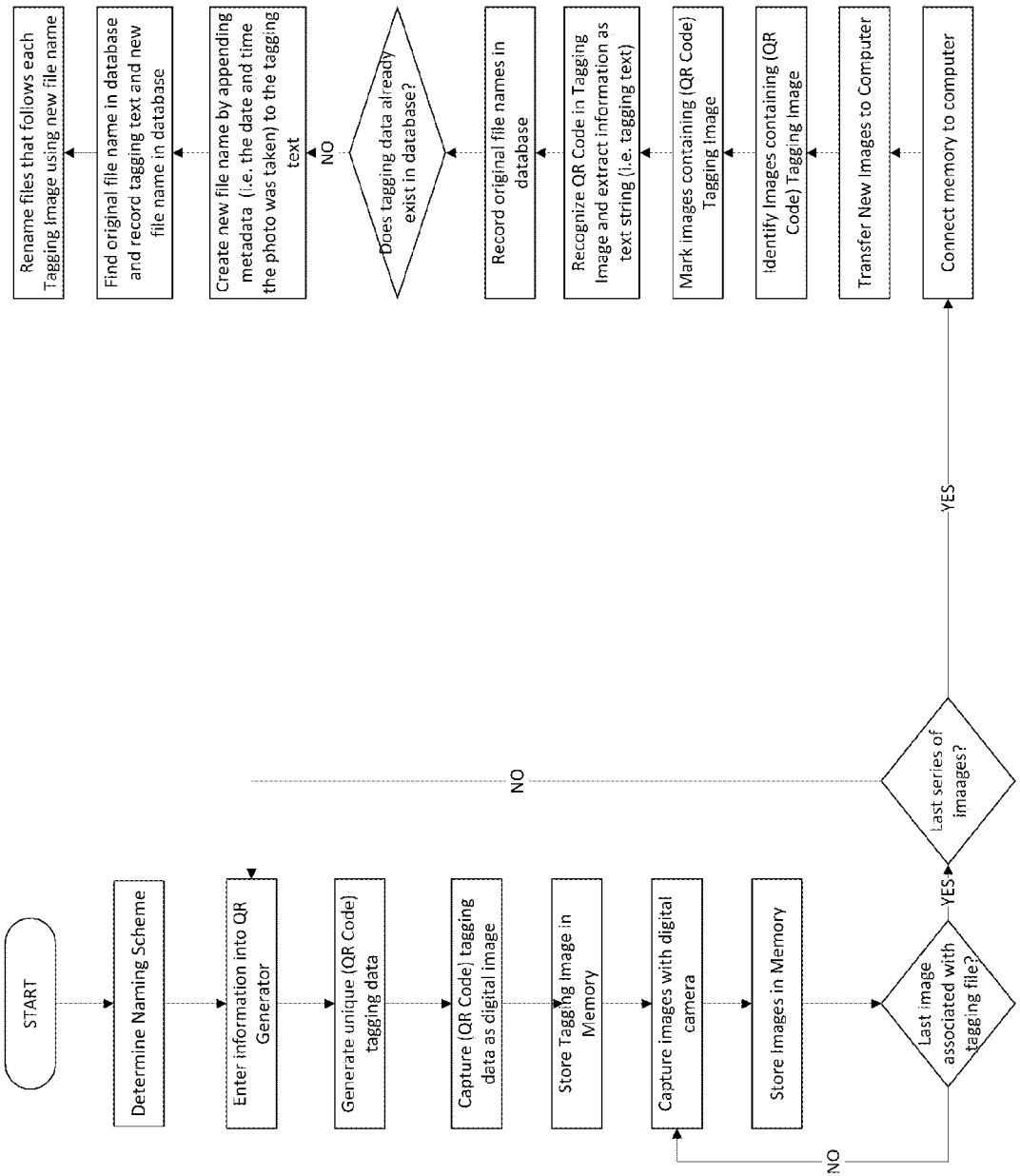
FIG. 10B is a flow chart illustrating a process for generating an annotated file name using a QR code in accordance with an embodiment of the invention.
Figure 11A:
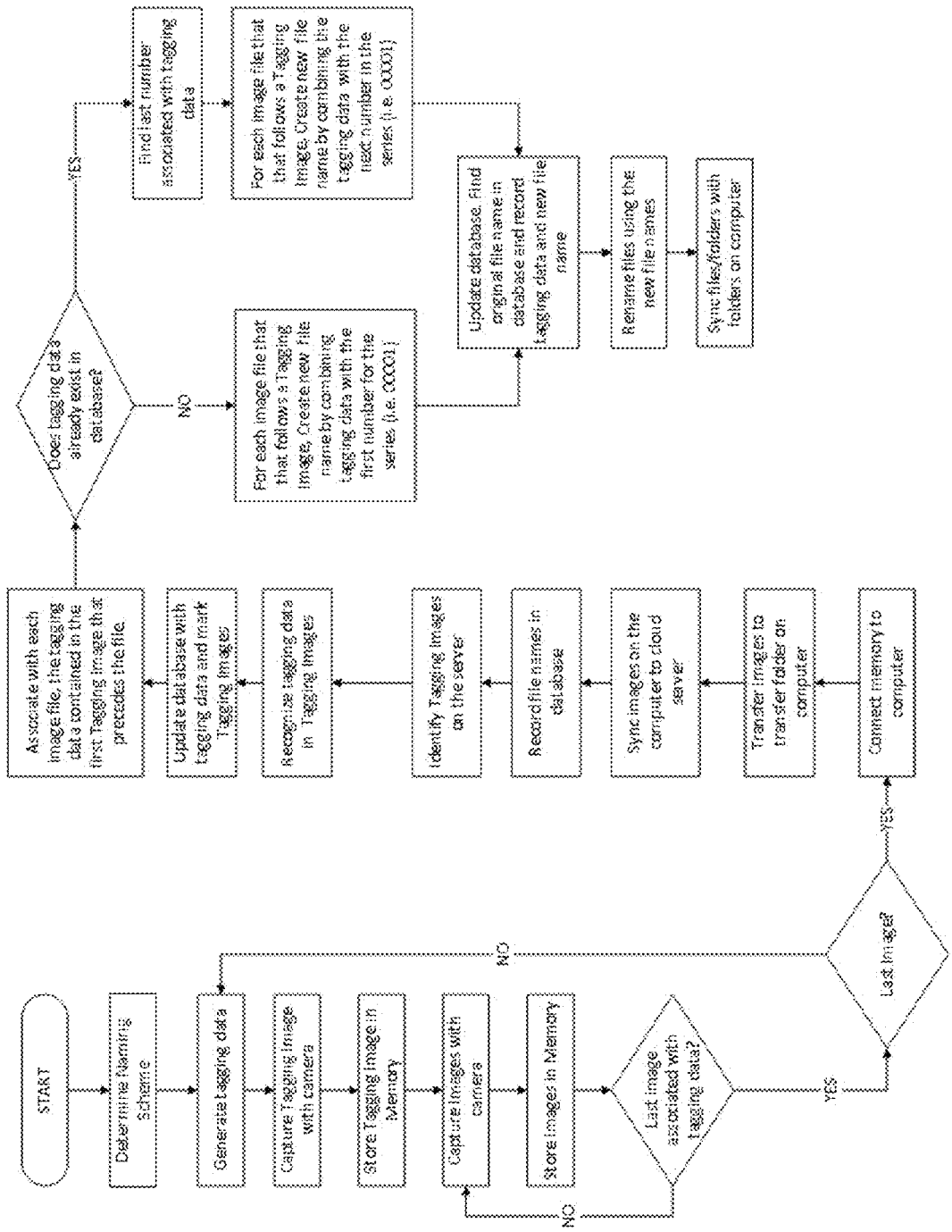
FIG. 11A is a flow chart illustrating a process for generating an annotated file name using an online platform in accordance with an embodiment of the invention.
Figure 11B:
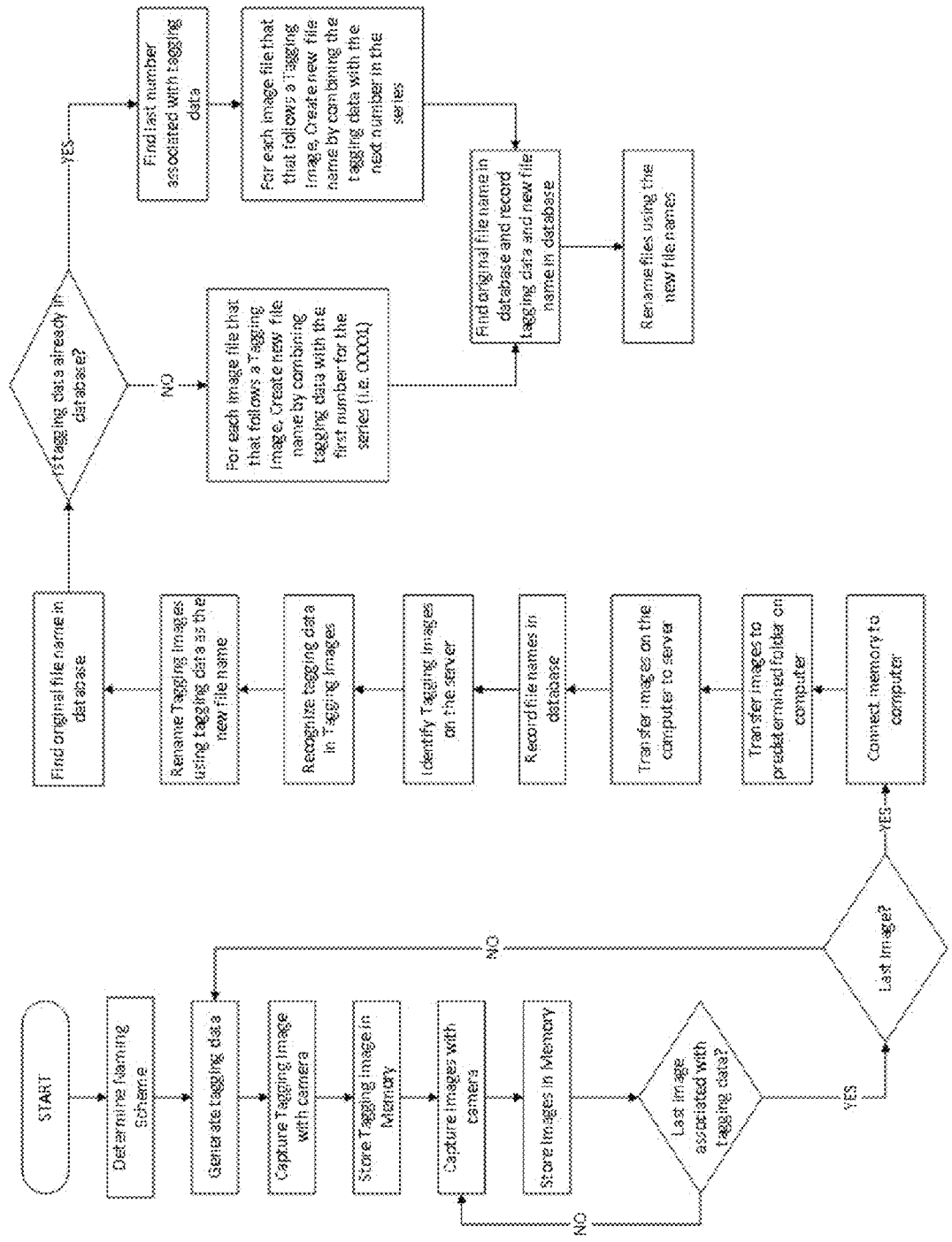
FIG. 11B is a flow chart illustrating a process for generating an annotated file name using an online platform in accordance with an embodiment of the invention.
Figure 12A:
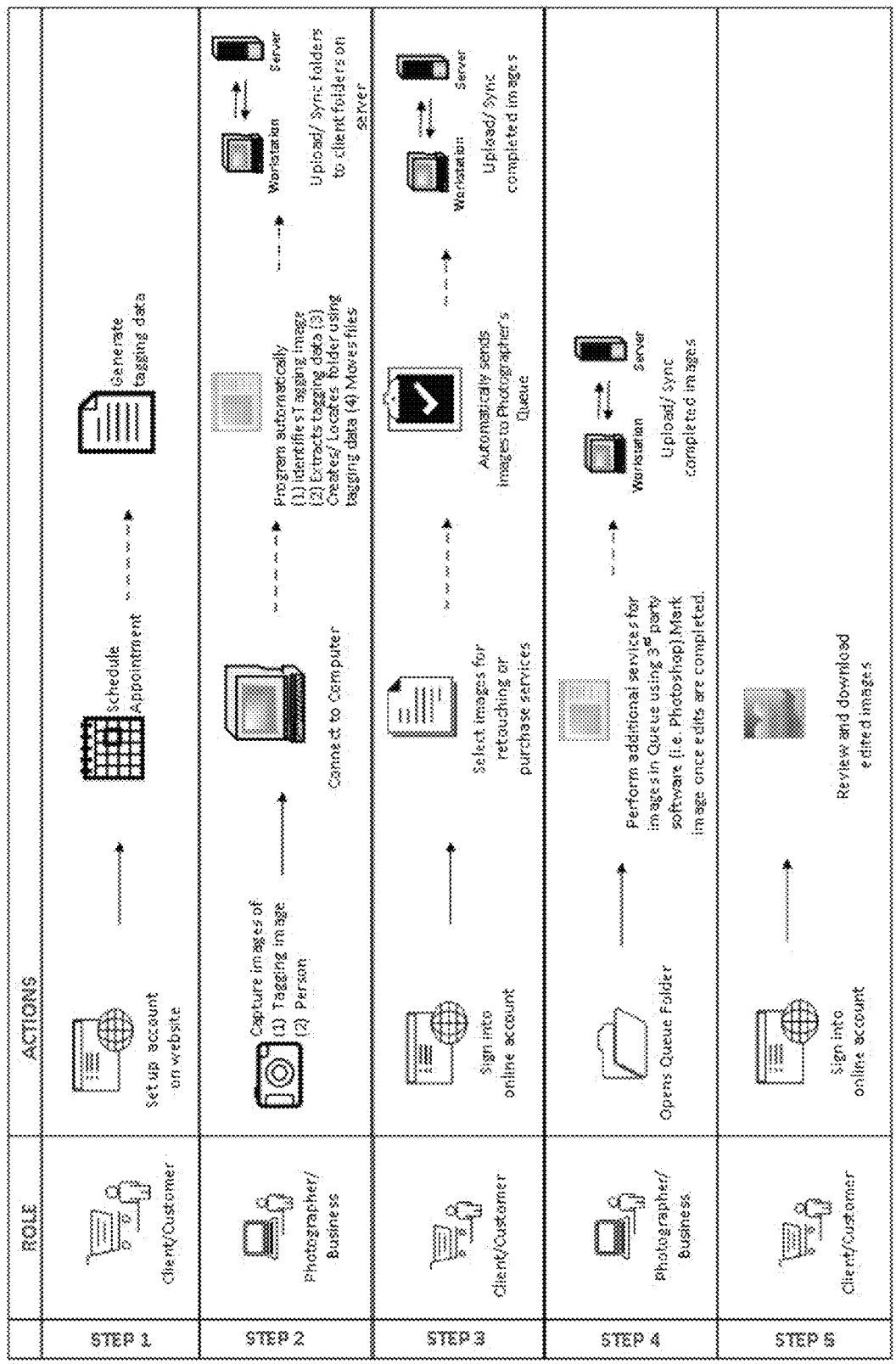
FIG. 12A is an illustration of a process associated with an image cataloging system that may be used for identifying, recognizing and associating client and appointment information with digital images in accordance with an embodiment of the invention.
Figure 12B:
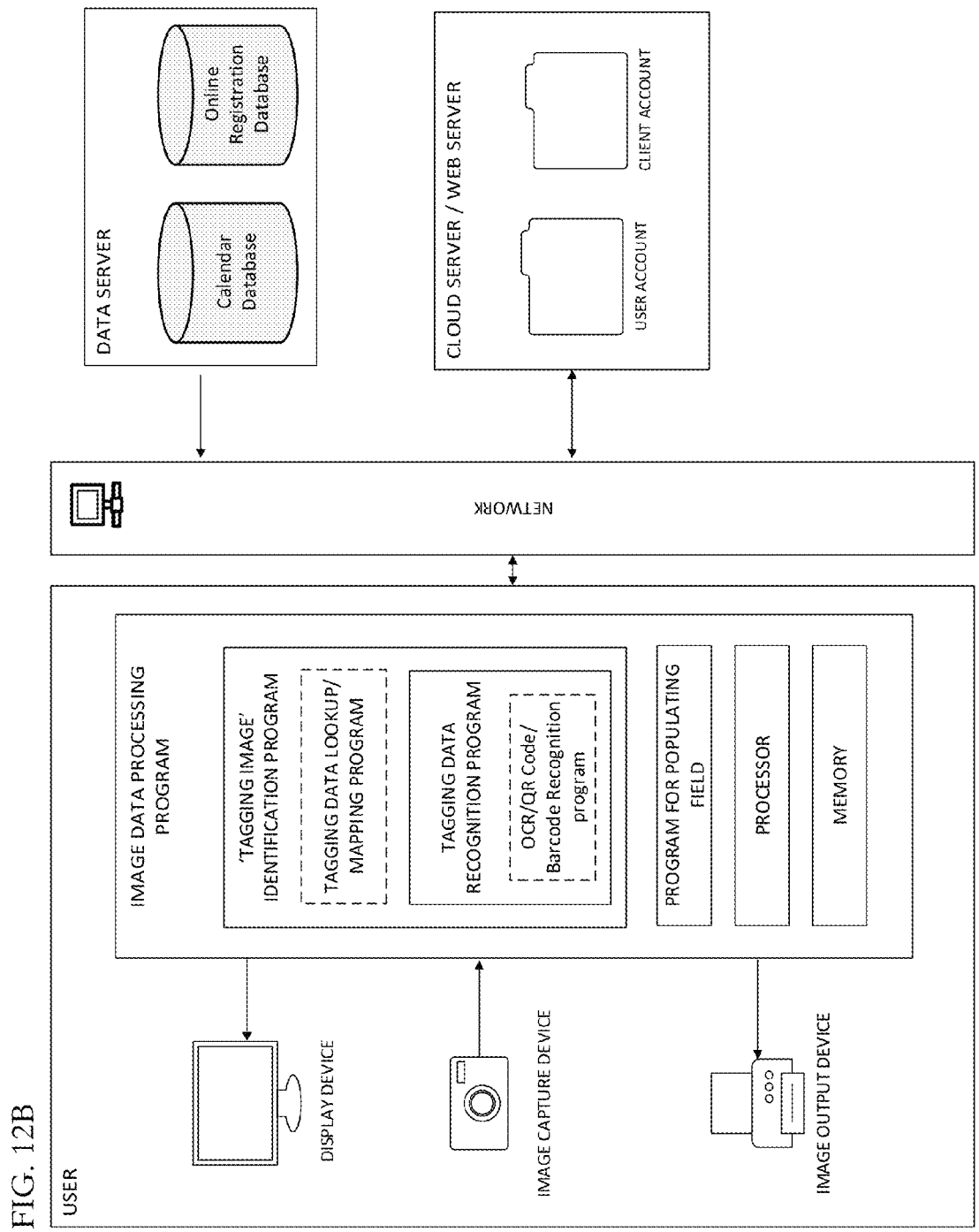
FIG. 12B is a block diagram of a part of a system for identifying, recognizing and associating tagging data in accordance with an embodiment of the invention.
Figure 12C:
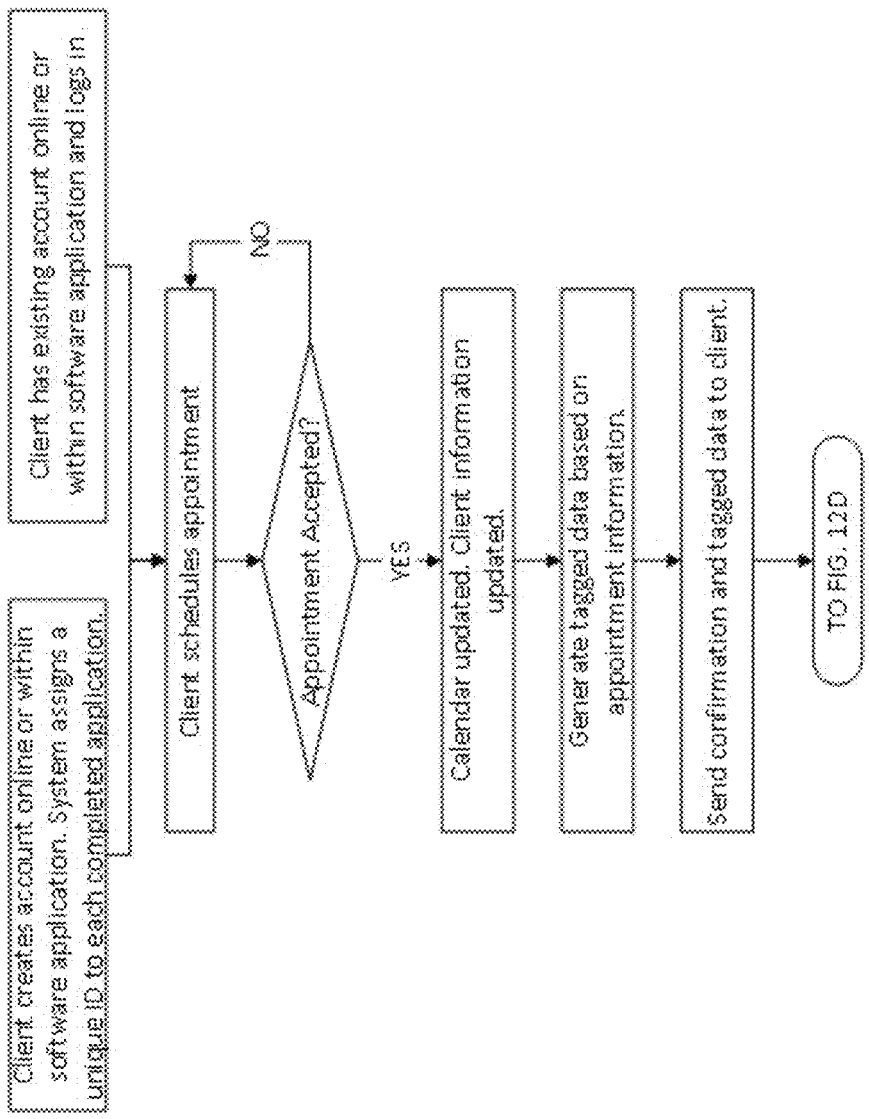
FIG. 12C is a flow chart illustrating a part of the method for cataloging digital images described in FIG. 12A.
Figure 12D:
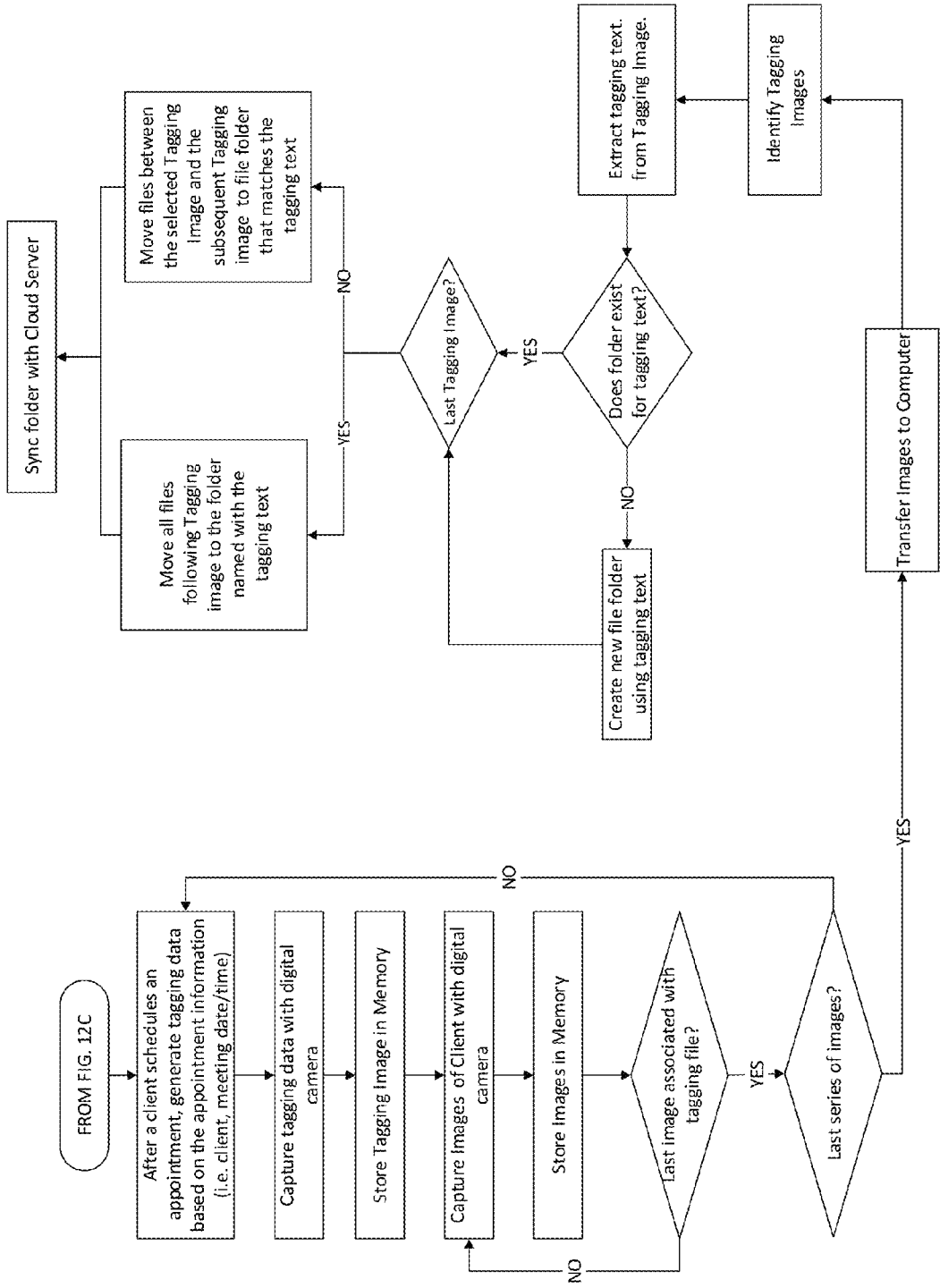
FIG. 12D is a flow chart illustrating part of a method for cataloging digital images described in FIG. 12A including generating tagging data based on appointment information.
Figure 12E:
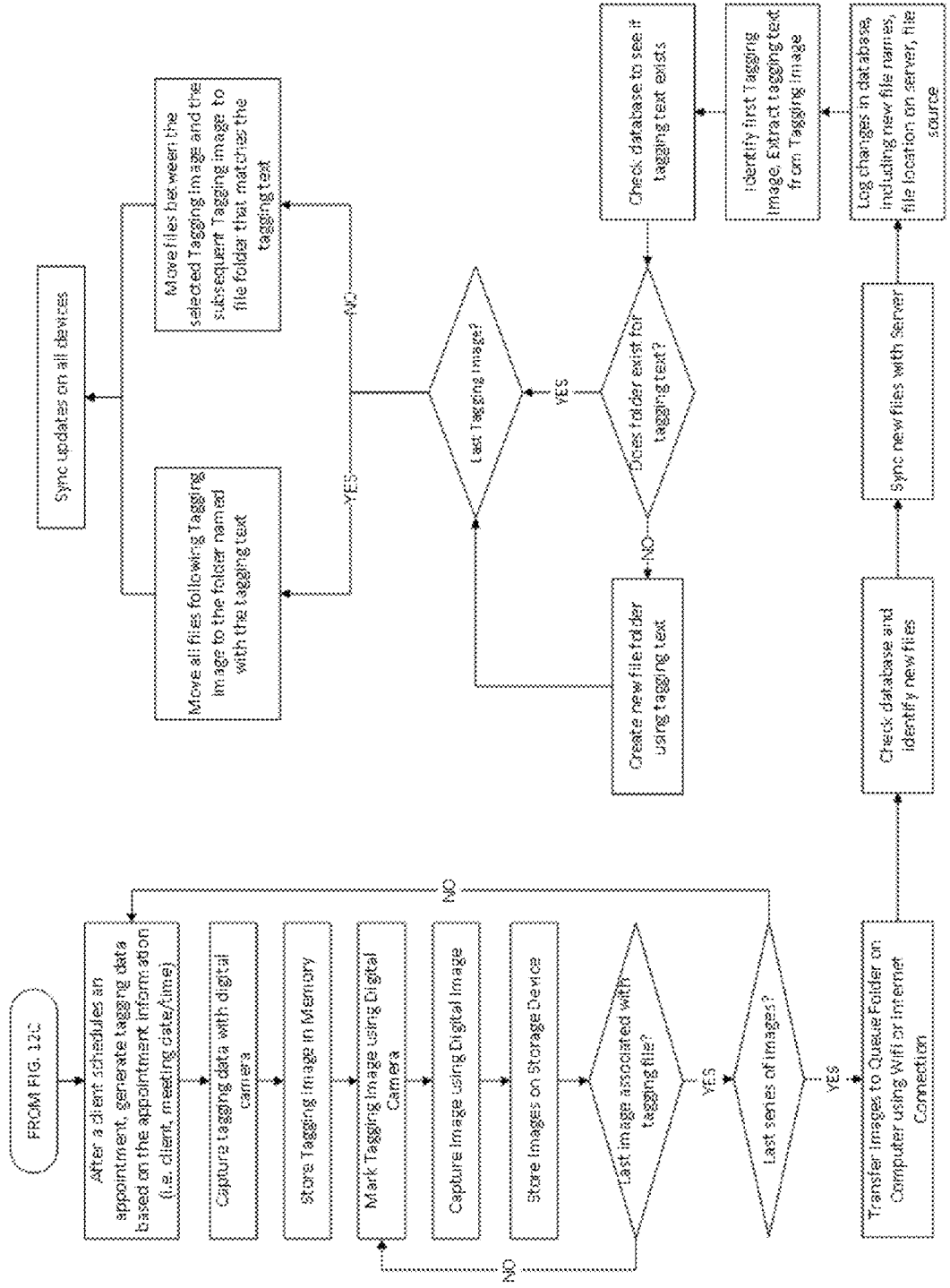
FIG. 12E is a flow chart illustrating a part of a method for cataloging digital images described in FIG. 12A including generating tagging data based on appointment information and logging changes in the database.

In one embodiment, an OCR module operates on the digital image files. The OCR module may identify the Tagging Image files by recognizing the text contained in each file and then search for Tagging Data in the content of the file. FIGS. 5A and 5B illustrate an embodiment of the invention wherein image files are named using a combination of text recognized by the OCR and the original file names created by the default naming scheme (i.e. combining the Tagging Data with the consecutive numbering created for each new digital image captured by an imaging device). The user may run a program that allows the user to identify the Tagging Images and automatically extract Tagging Data to associate with the identified digital image files. In accordance with an embodiment of the invention, the user may specify the naming convention for a set of image files, regardless of whether or not such naming convention includes Tagging Data.

By automating the process of generating meaningful file names, a user may significantly reduce the amount of time needed to catalog digital images. In particular, the user no longer needs to separate multiple series of images and rename each individual image in a series of images by using a common annotation or text data. In this manner, the user does not need to open each file to view the contents to create a meaningful file name. Similarly, automatically associating tagging data with digital images may be beneficial for organizing the files.

Figure 13B:
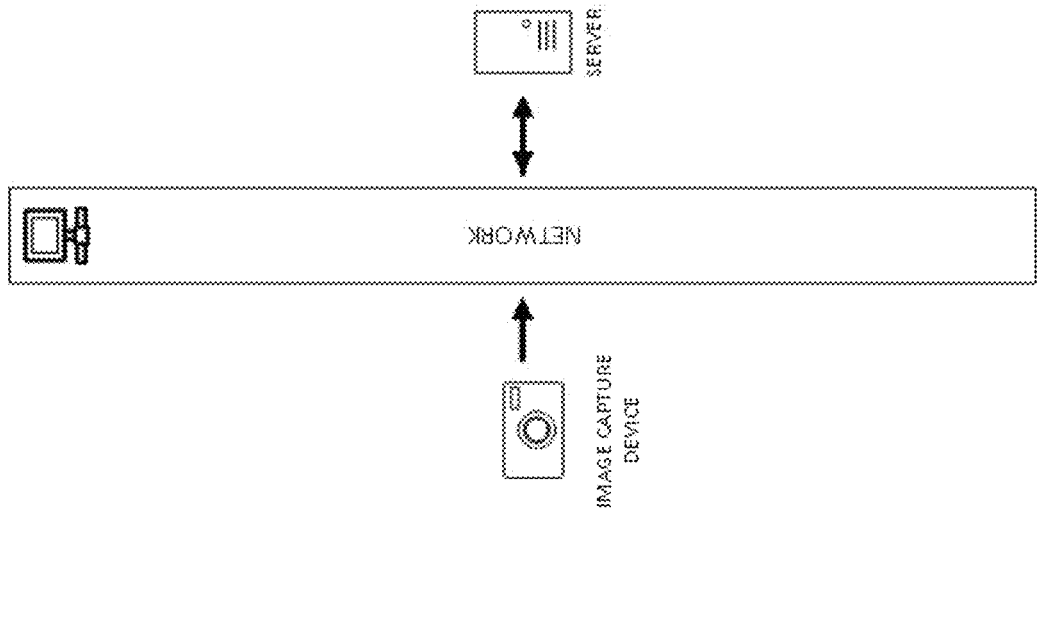
FIG. 13B is an illustration of a system for saving images from an imaging device to a server via a network.
Figure 13A:
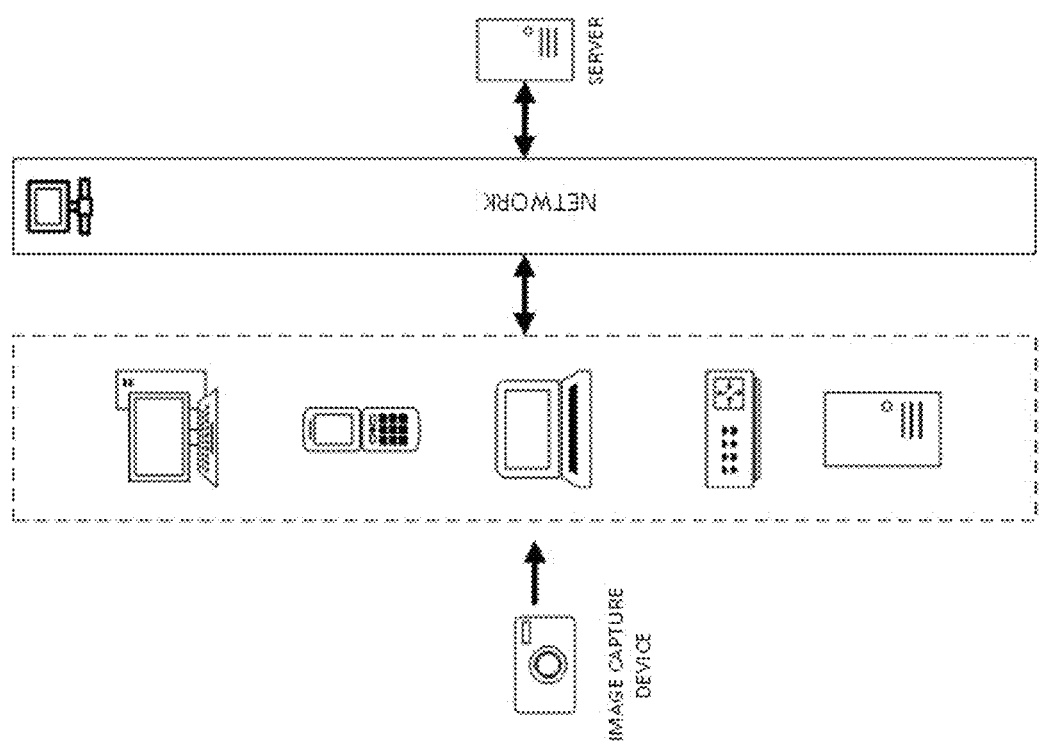
FIG. 13A is an illustration of a system for saving images from an imaging device to a server via a device and a network.

In the embodiment illustrated in FIG. 13A, the image files are transferred from the imaging device to one or more processing devices, and then transferred via a network to a server. By way of non-limiting example, the files may be transmitted using a wired or wireless connection, such as USB, Bluetooth, WiFi, or telecommunications/telephony service. Files may be stored in a repository on the imaging device, processing device, etc. The digital imaging devices may be configured to allow data to be exchanged across multiple devices, including but not limited to routers, servers, local area networks, phones, computers and laptops.

Figure 13C:
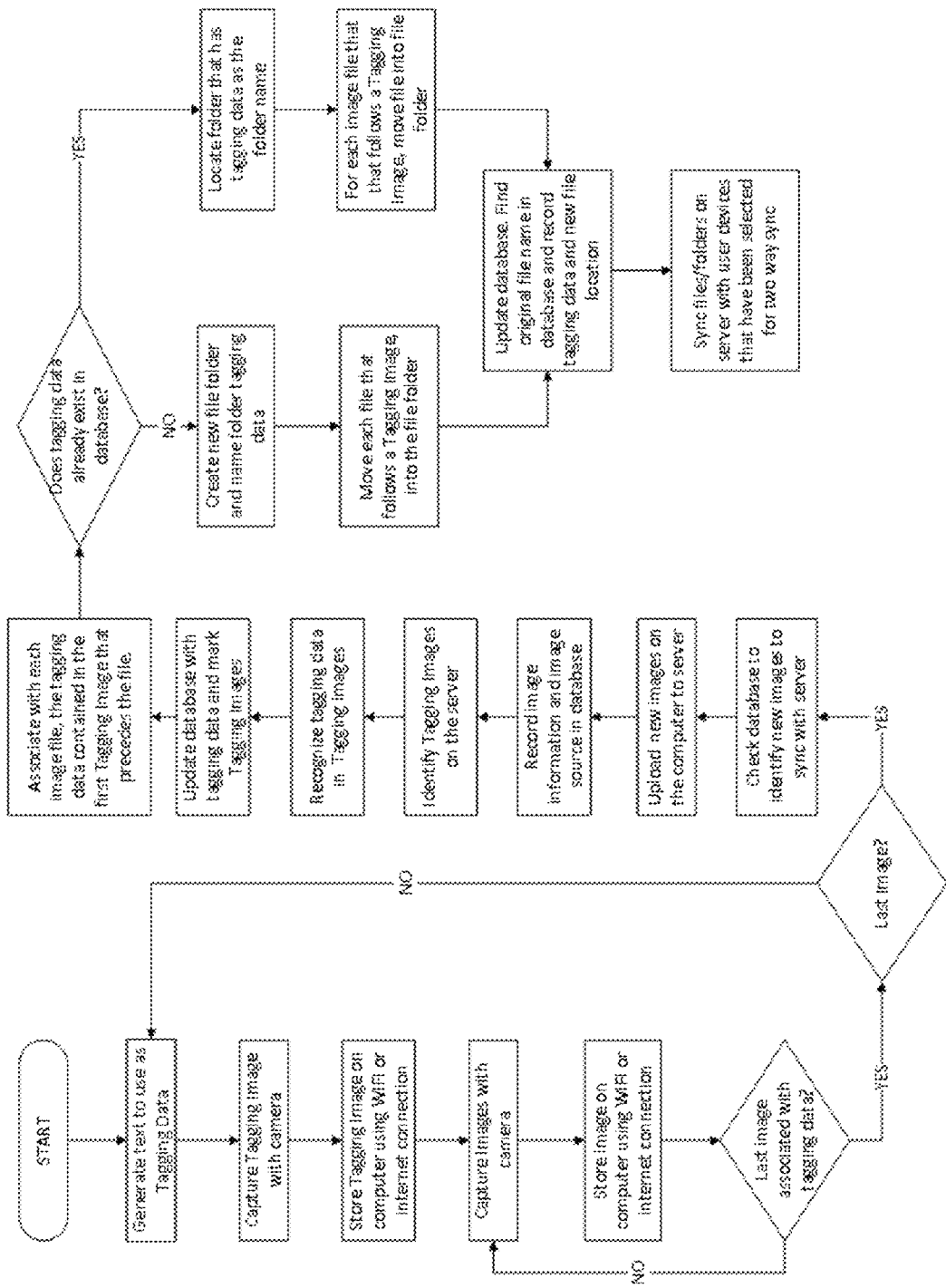
FIG. 13C is a flow chart illustrating a process for associating image files with tagging data in accordance with an embodiment of the invention.

Images files may be stored on a server through a network, telecommunications, or wireless connections and service, as illustrated in FIG. 13B. The image files may be stored one by one for each individual file, by series, or in batches, as is illustrated in FIG. 13C. In addition, image files may be uploaded or checked for updates either immediately, in regular intervals or scheduled ahead of time. Image files may also sync with the server using the configurations provided by a service provider or the user.

Figure 13D:
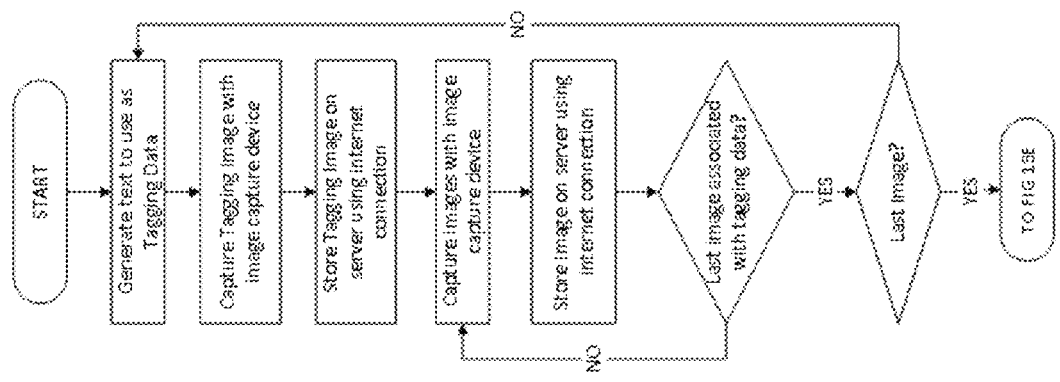
FIG. 13D is a flow chart illustrating a part of a process for associating image files with tagging data in accordance with an embodiment of the invention.
Figure 13E:
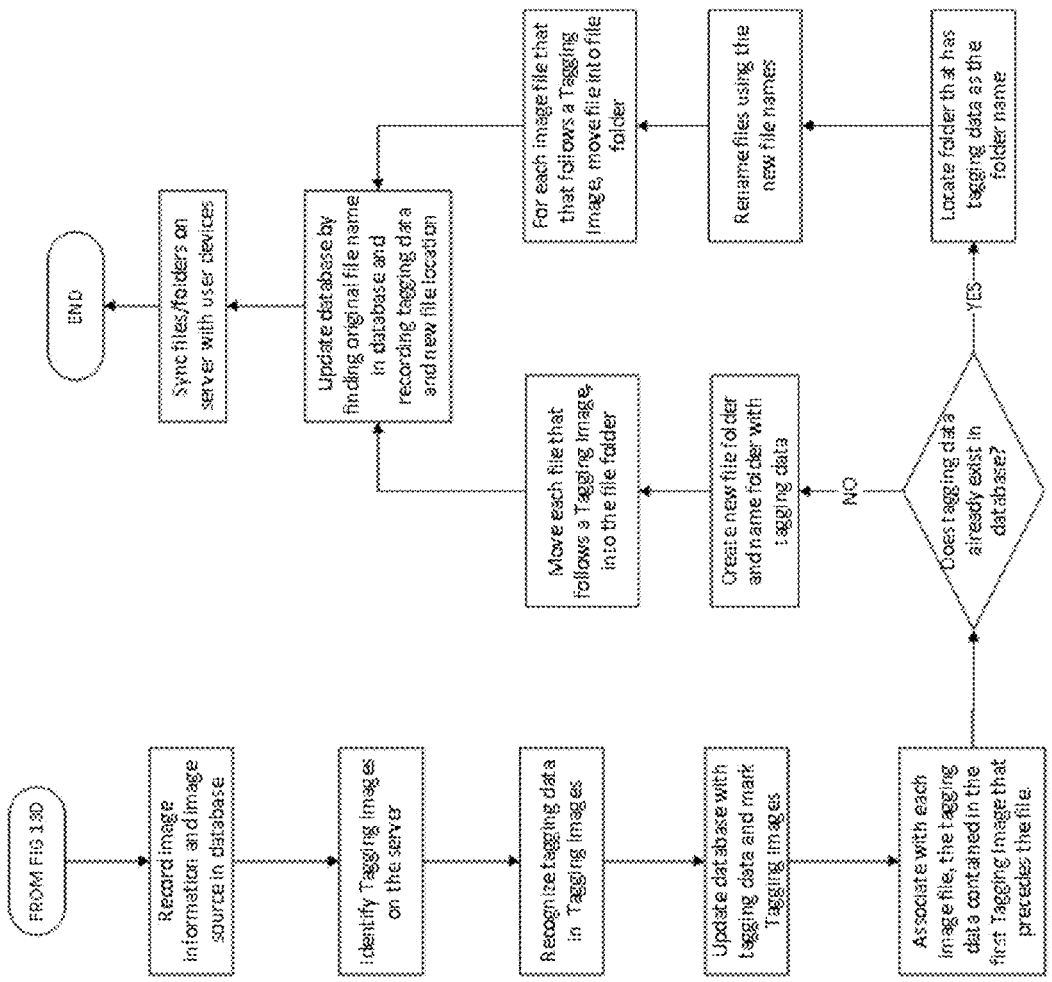
FIG. 13E is a flow chart illustrating a part of a process for associating image files with tagging data in accordance with an embodiment of the invention wherein a user may upload images onto a server and sync the files across user-specified devices.

Information about the files may be stored in a database and the database may be searched before initiating a file upload or update, in the interest of reducing the size of data transmissions. Users may choose not to initiate a two-way sync across all devices and may place rules or limitations on syncing with the server based on the imaging device or processing device. This approach preferably allows users to reduce the storage required for select devices. For instance, a computing system may have a large amount of storage available, but a mobile device typically has limited storage capability and replicating the same files and folders on both devices would be restricted by the storage capabilities of the mobile device. In addition, syncing a large number of files on both devices may use up more storage space on the mobile device than is desired by the user. For example, FIG. 13C illustrates a process flow for one embodiment of the present invention that utilizes two-way sync on preselected devices. Tagging images may be processed on the imaging device or on a processing device such as a computer after it is saved onto the processing device, as illustrated in FIG. 13D.

The system and method in accordance with an embodiment of the invention is preferably suitable for use with other file formats, and is not limited to image files. Additionally, the system and method is preferably applicable to files with or without Tagging Images. The files may be named or renamed individually, in a series, or in batches. A user interface may be implemented to rename files, which preferably facilitates the process. The user interface may take many forms, and may be accessed via mobile applications, servers, websites, etc.

For example, FIG. 14A depicts a user interface that allows new file names to be entered for multiple files according to one embodiment of the system. Whereas FIG. 14A illustrates an embodiment in which the new file names may be typed as text, one of ordinary skill in the art would understand that alternative methods may be used without deviating from the scope of the invention. For instance, drop down menus may be used, as is shown in FIG. 14B. In a non-limiting example, Drop down choices are populated using predictive analytics, machine learning techniques, using existing file names or from a predetermined list.

A user interface may display multiple files for which a user may enter or select new file names, as shown in FIG. 15A. The new file names may be applied immediately or a preview may be generated, as is shown in FIG. 15B, requiring the user to confirm.

The user interface may be used to identify the Tagging Images and OCR may be implemented to recognize the text in the selected image files before renaming a series of image files.

Figure 15C:
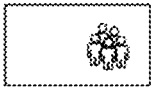
FIG. 15C is an illustration of an interface for renaming files in accordance with an embodiment of the invention.
Figure 15D:
FIG. 15D is an illustration of an interface for previewing the change of file names illustrated in FIG. 15C.

The user interface may display digital images, such as icons, to aid in the renaming of files. For example, FIG. 15C shows a user interface that displays the file name and an icon displaying the image within a particular location, such as a file folder, or a grouping, such as a category populated using metadata. The user may enter information, such as a new file name, to associate with a plurality of files simultaneously, and submit these changes. The updates may be previewed in a second user interface, as shown in FIG. 15D, before the changes are applied. The changes may be applied immediately upon submission, saved, scheduled, or requested. A request for changes may be sent to a third party computing system upon submission to implement the changes on a external system or device.

The user interface may also be used for rapidly renaming multiple series of files. In some embodiments, multiple files may be renamed by entering a new name in the data entry field corresponding to the first file in each series of files. For example, FIG. 16A illustrates a user interface that uses the first populated data entry field under "New File Name" to rename each subsequent file using the new file name entered in the field, and a distinct identifier, such as a number. This continues either until the system comes across another populated field for "New File Name," whereupon the subsequent files are renamed using the new file name entered in that field, or until all of the files are renamed.

Referring to the example shown in FIG. 16A, new file names are entered for File 1 and File 3. The system begins by checking the "New File Name" data entry field in the first row. If a new file name exists, the system will rename the file with the new file name, New File Name 1, and assign it a number, 1. Then the system will check the second row to see if the data entry field is populated. If a new file name exists, the system will assign the new file name, and attach a sequential number to the new file name. If a new file name does not exist and the data entry field is not populated, the previous new file name is used, New File Name 1, and the next sequential number is attached to the new file name, 2. This process continues until the system reaches the last row. FIG. 16B illustrates a preview of the file names submitted in FIG. 16A using this file naming process.

Upon submitting the form, the file changes may be implemented immediately and directly by the system. Alternatively, the changes may be requested by the user and implemented by the system at a later time. The request may be sent to a third party service provider, a system queue for processing, or initiate a workflow.

The system may enable users to rename a subset of a series of files by providing a user interface wherein the user can identify a start point and end point for the file naming process. For instance, FIG. 16C illustrates a user interface for one embodiment wherein users may enter a new file name for the first file in a series of files, and if the first series is followed by another series of files that is to be renamed, the user may enter the file name for the second series in the row with the first file in the second series of files. If the user is not interested in renaming the files that follow immediately after the first series of files, the user may end the file renaming process for the first series of files by entering the word "END" in the row corresponding to the first file following the last file in the first series (i.e. The first file that should not be renamed) and the user may repeat this process to rename every series of files that follow the first series. It is to be understood that the file having "END" in the "New File Name" field may alternatively be the last file in the respective series without deviating from the scope of the invention.

Figure 16E:
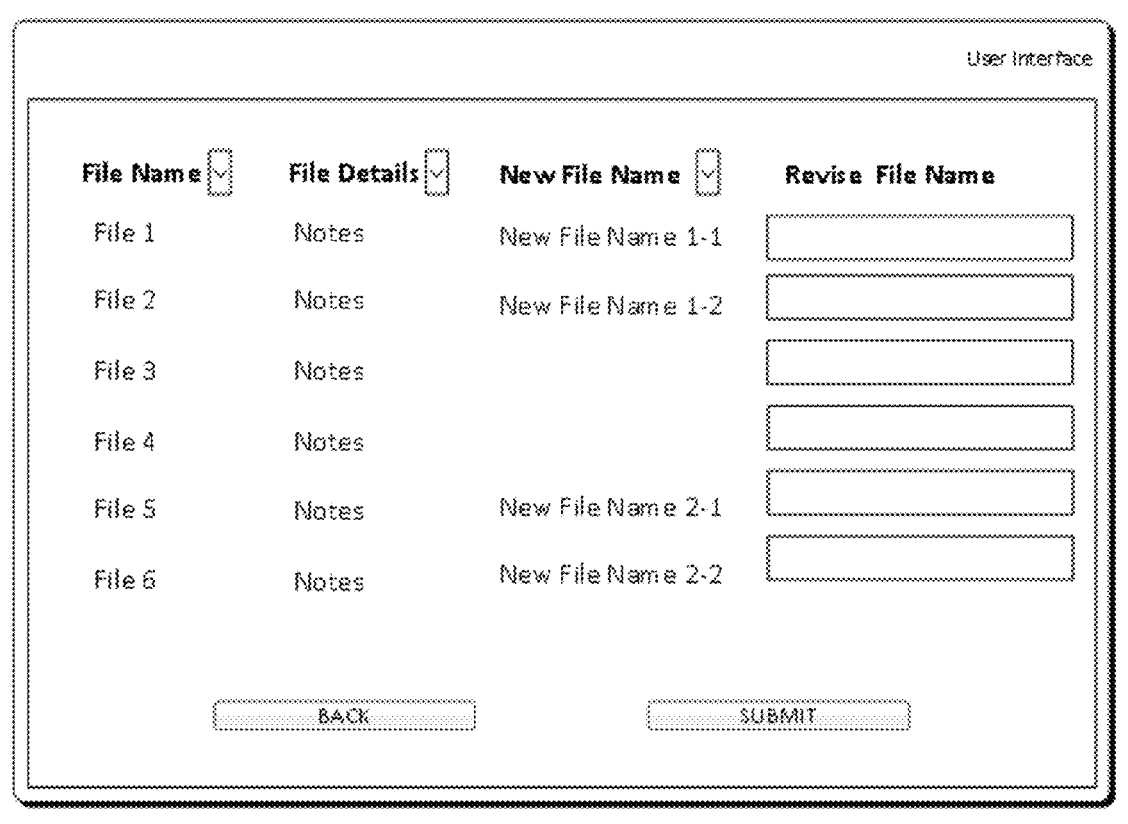

For example, after previewing the changes via the embodiment of the user interface shown in FIG. 16D, the user may click the "submit" button to request the changes from a third party hosting service. This may be done with API, REST, etc. and the user may enter credentials to access account information stored on a third party service provider, host, or server. The new file name request may be forwarded or submitted to the third party service provider for processing or alternatively the changes may be implemented immediately. Alternatively, the requested changes may be submitted and processed at a later time. For instance, the file changes may enter a system queue that is processed to manage the server load or the user may schedule a specific date and time for processing the files. In addition, users may change the file names after previewing the changes. For example, FIG. 16E shows a user interface that displays the new file names submitted from FIG. 16C and enables users to sort, filter, and order the files based on the file name as well as other information associated with the file.

Another feature an embodiment of the invention provides is the ability to organize files more efficiently. The user may group, tag, or move a series of files using the common file name or by entering an alternative name. For instance, after a series of image files (I.e. A.JPG, B.JPG, and C.JPG) is renamed to christmas2014_1.jpg, christmas2014_2.jpg, and christmas2014_3.jpg, the user may request that a folder be created (i.e. Christmas2014) and automatically move these image files into the new folder.

FIG. 16F illustrates an example of a user interface that enables users to organize the files based on new file names submitted in FIG. 16E. Users may create file folders based on the new file names and automatically move the files into these folders. Alternatively, users may create new folders by entering new folder names and selecting the files to be moved into the folder. The user may also choose to associate metadata or enter additional information based on the grouping.

In accordance with an embodiment of the system and method, a file queue may be used to organize and manage workloads. For instance, users may identify files that need to be edited, revised, updated or organized. These files may be moved to a queue folder, directory, or list until the user indicates that the file is complete or that the desired actions were performed. The file may then be returned to the original location or the user may select a new location for the file. A queue may also be used to upload files from multiple sources. For instance, files may be uploaded from various devices into a queue and the file data and source information may be logged by the system.

Figure 17A:
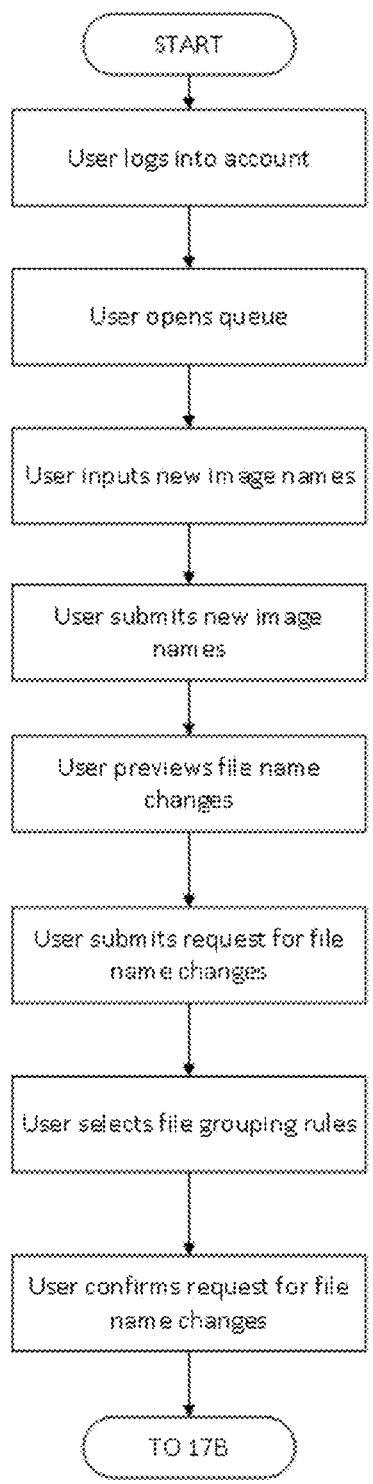
FIG. 17A is a flow chart illustrating a process for renaming files in accordance with an embodiment of the invention.

FIG. 17A illustrates an exemplary process flow chart wherein the user logs into their account using a user interface on a website. The user opens a queue that is used to store new and unorganized files, and then uploads new files into the queue. The user enters new file names for the new files and submits the changes. The user is presented with the option to group files using logical rules or by selecting specific files. The user confirms all changes and file groupings before submitting the request.

Figure 17B:
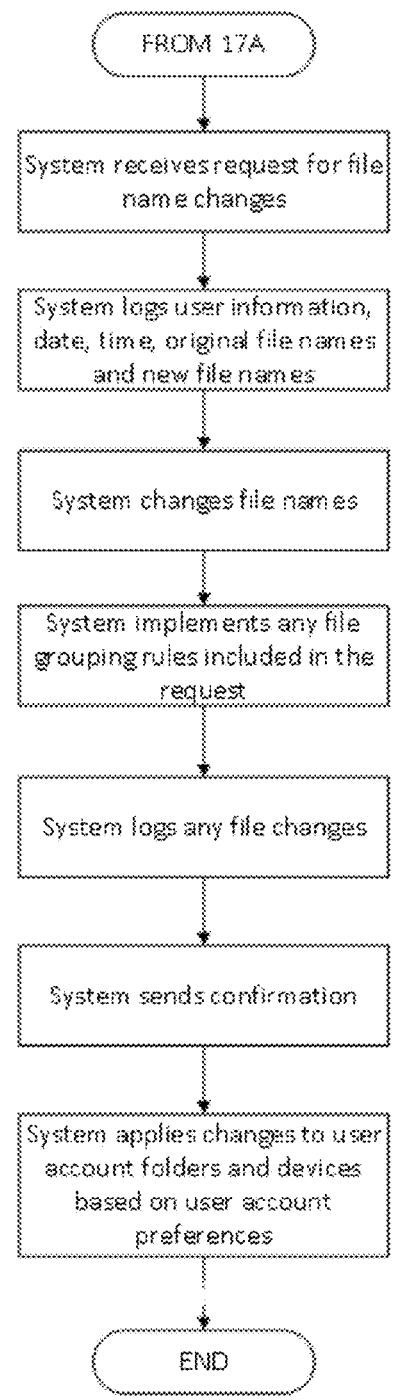
FIG. 17B is a flow chart illustrating the system's side of the process of FIG. 17A.

To make changes to files, users may be prompted to submit credentials to access files on the system or a third party server, and changes may be made immediately. Alternatively, requests may be sent to a third party server or service. In the example illustrated in FIG. 17B, the request is submitted to a file hosting service and the system records the request, which includes the user's information, the date/time of the request, and the changes requested. The system processes the changes, including changing file names and grouping files into folders, and logs the changes, and then a confirmation message is sent. The system then reflects these changes across all the devices linked to the user's account based on the user's account settings and preferences.

In certain embodiments, the system may log files as it is transmitted or stored on computing systems or other processing devices, and update the log to reflect any changes being made.

The user interface preferably presents user content (e.g. files) wherein files can be grouped by type, date, name, etc. Another novel feature of an embodiment of the invention is that it can display files with both current and historical information associated with user content. For example, the user may access historical data from logs and search all previous file names associated with the file.

The system preferably also provides a user interface via which user may organize, log, and process any files on the computing system. By processing file changes through the user interface, users can log and record all file changes for future reference. For instance, the user interface may access any file folder or directory available on a desktop computer and any changes made to the files in this folder can be logged by the system. Similarly, the user may use the user interface to access specific folders and search these folders for specific files or content using logic based rules. Users may also schedule file changes to be run at a later time.

When files are altered directly in the device in which they are stored, there is usually no log of the changes that have been implemented. For instance, if a file is moved from one folder to another folder and the user does not remember the new location of the file, there is no log that can be referenced to find the new file location. This may be especially problematic if the file is moved to the new location and then renamed, because the user will be unable to search for the file if he cannot recall the new file name or the new file location.

Implementing changes to files through the user interface preferably enables users to selectively log file changes. Selecting which changes are logged eliminates the need to record every change that occurs on an operating system, which is generally an infeasible option due to the large number of changes that occurs on a computing system as it is accessed by a user. Furthermore, since users generally are not interested in operating system changes, this may provide users with the ability to control the amount of data recorded on the computing system by capturing just the information that is of interest to the user.

An embodiment of the invention also enables users to capture a snap shot of all files on the computing system at a specific point in time, which can be referenced at a later point in time. This allows users to identify discrepancies and run reports of all the changes that may have occurred between two points in time.

The system may also provide access to historical information regarding file requests and changes made, through a user interface, website, or portal. The interface may provide options for displaying log data, which may include search method selections and/or historical information (i.e. changes or updates), as is shown in FIG. 18A. The logs may also be selected based on the structure or organization of the files. For example, FIG. 18B depicts an exemplary user interface for selecting a folder for which information has been logged.

Logs may enable users to search file histories based on a variety of file names, characteristics, and history as well as file-related events. For example, FIG. 18C depicts an exemplary interface that allows users to search files by selecting a field and entering a query. The search criteria specified by the Text may be in any number of styles, formats, programming languages or queries.

In other embodiments, the logs may be searched using any field for which data is collected or recorded. For example, searches may be for specific data types, such as dates, as well as for search terms for a user specified field, as is shown in FIG. 18D.

Figure 18F:
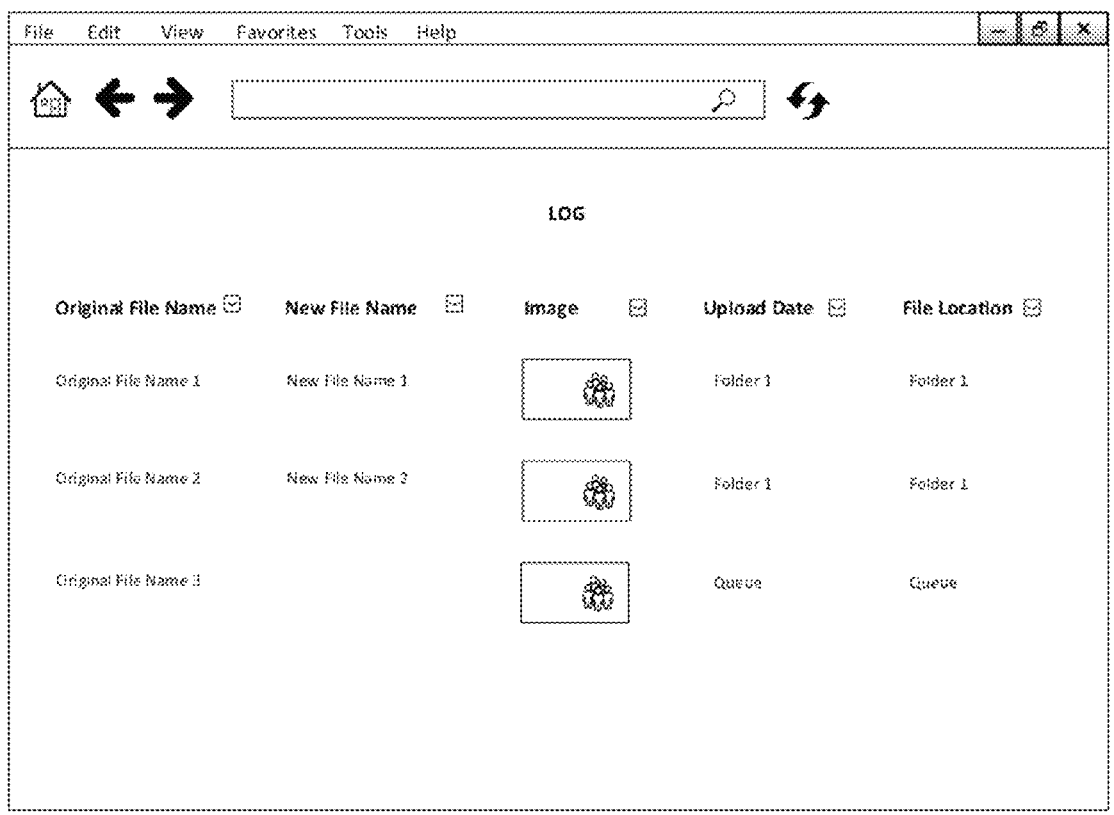
FIG. 18F is an illustration of an interface for viewing historical data regarding files in accordance with an embodiment of the invention.

The logs do not necessarily require the search functionality and may be for record keeping purposes. The logs may rather be displayed to the user without offering any further action to be taken by the user, as is shown in FIG. 18E. The logs may also be accessed, organized, and filtered by users through a user interface or website, as is shown in FIG. 18F.

The logs may record all the changes implemented for files, folders, directories, etc., which may be searched to find files based on current file names or file information as well as all past file names or file information.

The user interface preferably facilitates searching and/or browsing content of a plurality of devices via a single unified experience. The logs may store information about the file source, such as the name of a mobile device or personal computer. These logs may be referenced by the system to check for file or system changes to improve the upload, download, and synching of images across devices.

Figure 19A:
FIG. 19A is an illustration of an interface for viewing an index of files for a user in accordance with an embodiment of the invention.
Figure 19B:
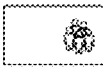
FIG. 19B is an illustration of an interface for viewing an index of files for a user in accordance with an embodiment of the invention.
Figure 19C:
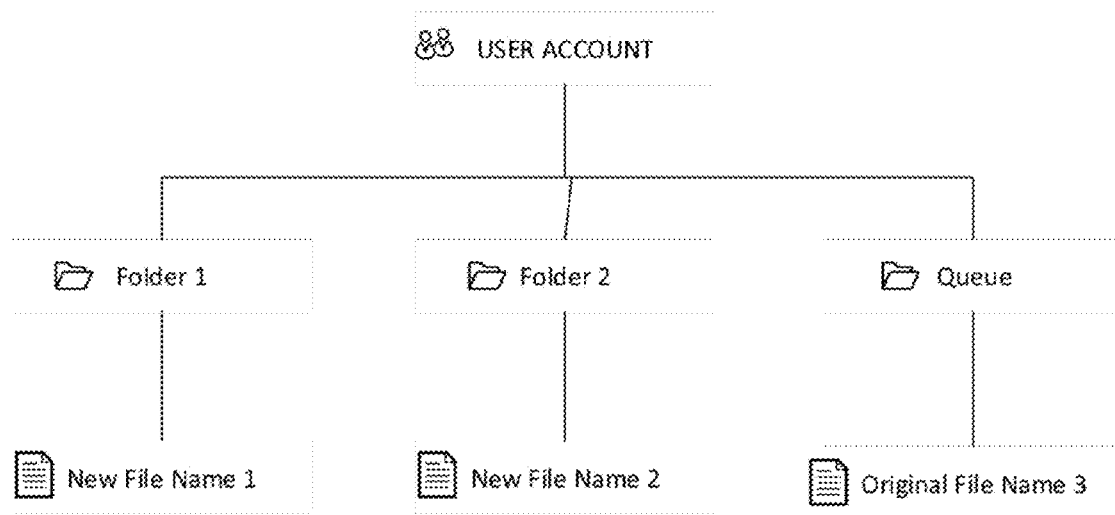
FIG. 19C is an illustration of the arrangement of files for a user in accordance with an embodiment of the invention.

Preferably, the system can also distinguish between the historical or logged information and the content currently available on the system. The source logs may be searched to find information associated with the file, such as the original file name. The user may access a list of all available files via the user interface. For example, FIG. 19A illustrates a user interface that displays an index of all available files for a particular user account, as shown in FIG. 19C. This allows users to view, filter, search and review files contained within a selected folder, as shown in FIG. 19A. FIG. 19B illustrates a web portal that also displays the file information as well as the file content, such as image files, through a website.

File lists may also be used to create a unified view of various files from multiple locations (i.e. file directories or folders) without physically moving the files or committing any changes in the system. In addition, users may create multiple lists that associate files to a link or path to the same file rather than creating multiple copies of a file.

The file lists preferably also enable users to create portfolios with rule-based logic, access restrictions and security policies. File lists may also allow file name aliases to be displayed on the front end without changing file names on the back end. For example, a user may create a list of files that can be displayed through a web portal. The user may choose to enter file name aliases and hide the file names from public view. For example, if there are two files, XYZ.txt and ABC.txt, the user may enter aliases, File1.txt and File2.txt respectively, and hide the file location and file names without making any changes to the files themselves. This enables users to associate multiple file names to a single file without reproducing the file, thereby reducing the amount of disk storage and organization require managing the multiple instances of the same file. In addition to the file name aliases, the file lists may also include other information that is specific to that list, such as a file description.

By way of non-limiting example, in FIG. 20B the user creates a list and enters an alias, illustrated as "List File Name." The system preferably displays an alias for the files for which the user enters a List File Name. Alternatively, the system may generate for each file on the list, an alias by using a combination of the file name and a number, for example, in sequential order from top to bottom. In accordance with an embodiment, the list may be created to automate a process, such as renaming every file on the list.

In the example shown, File 1, File 2, File 3 and File 4 are provided an alias File A, File B, File C and File D, respectively. File 5 and File 6 are not provided with an alias. Once the user submits the changes, a confirmation page may be presented to the user to confirm the changes. In the embodiment shown, both the File Names and List File Names appear along with the description, so that the user can compare and make sure the aliases were assigned to the proper files. For files for which no alias is provided, such as File 5 and File 6, the original file name appears under the List File Name column.

The system may also provide an option to preview the aliases after it is submitted by the user, as is shown in FIG. 20C. Once the user clicks "Preview," the user is presented with the preview of how the aliases would appear, as shown in FIG. 20D, wherein the aliases (File A, File B, etc.) appear under "List File Name," but not the actual file names (File 1, File 2, etc.). The user may then choose to edit the list again or create the list using the information as shown.

Once the list is created, it may be visible and/or accessible to other users, such as clients, without the authority to make edits thereto. When a client clicks on the list name or open the list using any other suitable means, they are preferably presented with a user interface, for example, as shown in FIG. 20E. As shown, the aliases appear in the "File Name" column, consistent to FIG. 20D. Preferably, the entries under the "File Name" column are hyperlinks, or other means for accessing the file being referenced, so that when the client clicks on a file name, the corresponding image file or other file is opened and displayed to the client. For example, if the client clicks on "File A" in FIG. 20E, the file "File 1" is accessed and displayed to the client.

Creating a file list may trigger another action as part of a workflow of process. For example, FIG. 20F illustrates a user interface that may be displayed as confirmation that the new list has been created, which provides the user with several options. In the embodiment shown, the users may share the list on the Internet by enabling public access; the users may provide private access by creating a login screen for new clients; link the list with a specific client account that already exists on the system; or send a direct link to the list to clients or other individuals.

In one embodiment of the invention, users may create an account to store and access the files transmitted to the server from one or more devices including a mobile phone, tablet, computer, camera, server, etc. Users may grant access to others, such as clients, by creating a workflow or process for client registration, such as implementing a web-based client registration form. In some cases, the registration form may include other workflow tasks, such as the option for the client to make an appointment with the user.

Figure 21A:
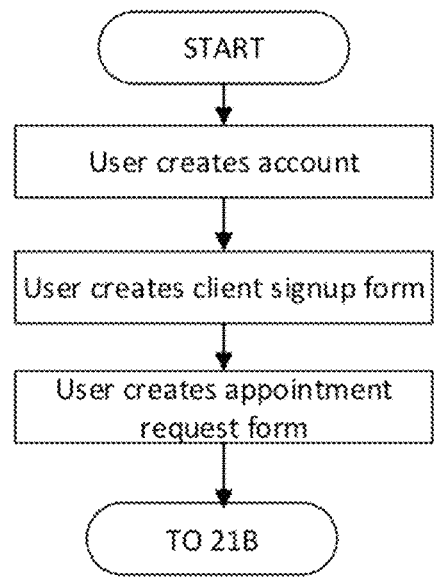
FIG. 21A is a flow chart illustrating a process for creating a user account in accordance with an embodiment of the invention.
Figure 21B:
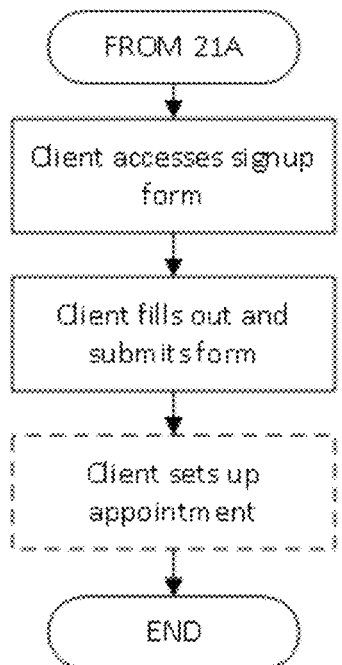
FIG. 21B is a flow chart illustrating a process for scheduling an appointment in accordance with the embodiment of FIG. 21A.
Figure 21C:
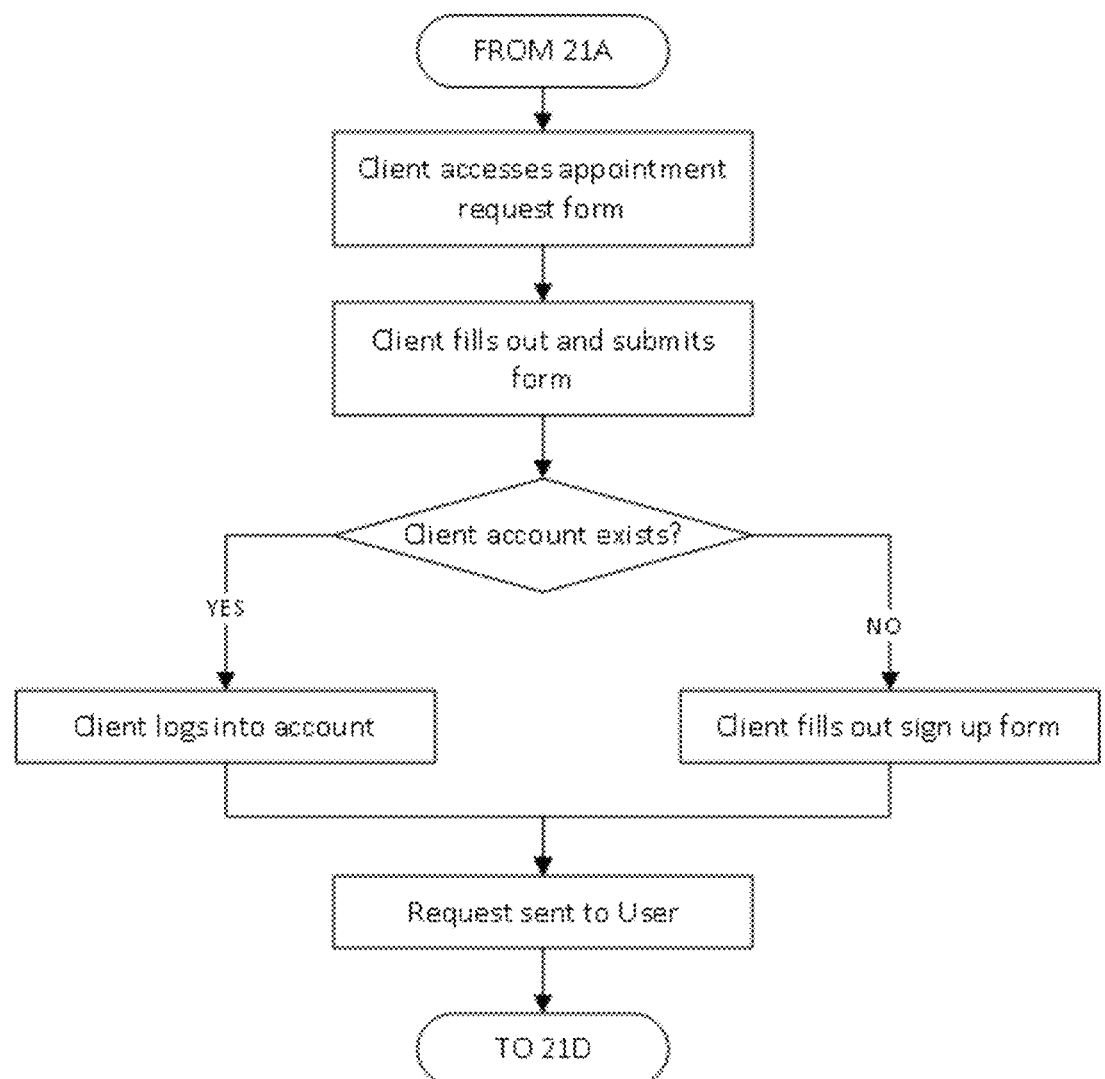
FIG. 21C is a flow chart illustrating a process for scheduling an appointment in accordance with the embodiment of FIG. 21A.

Upon submitting the appointment request form, the system may check whether the client is registered in the system, as shown in FIG. 21C. The system preferably notifies the user of the client request if it is submitted by a registered client, or directs unregistered clients to a registration form and notifies the user once the client is registered.

Figure 21D:
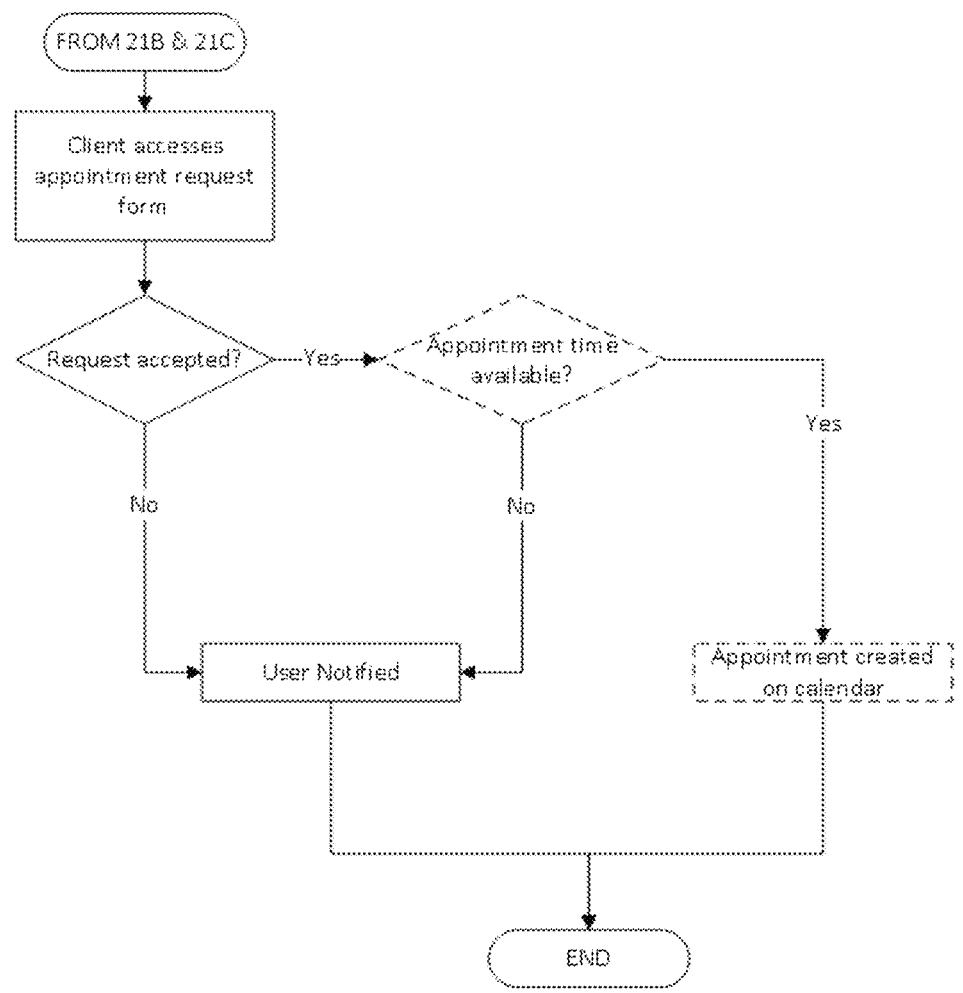
FIG. 21D is a flow chart illustrating a process for scheduling an appointment in accordance with the embodiment of FIG. 21A.

The user may configure an appointment request process to automatically create appointments for a date/time requested by the client by referencing a source that contains information about the user's availability, such as a calendar. Alternatively, the user may configure the appointment request form to notify the user prior to creating the appointment. For example, in FIG. 21D the client accesses the appointment request form and submits a request for an appointment. The system checks the user's calendar or schedule. The system automatically creates the appointment if the user is available and informs the user if the date/time is unavailable or a conflict exists.

Certain embodiments of the invention may include some or all of the features previously described. The features may not necessarily exist on the same computing system or server and it may be constructed with other servers and services. For example, the image files may be stored on a file repository that is separate from the system that processes the files. Alternatively, files may be stored with another service provider and accessed with API calls or by submitting credentials.

Figure 22A:
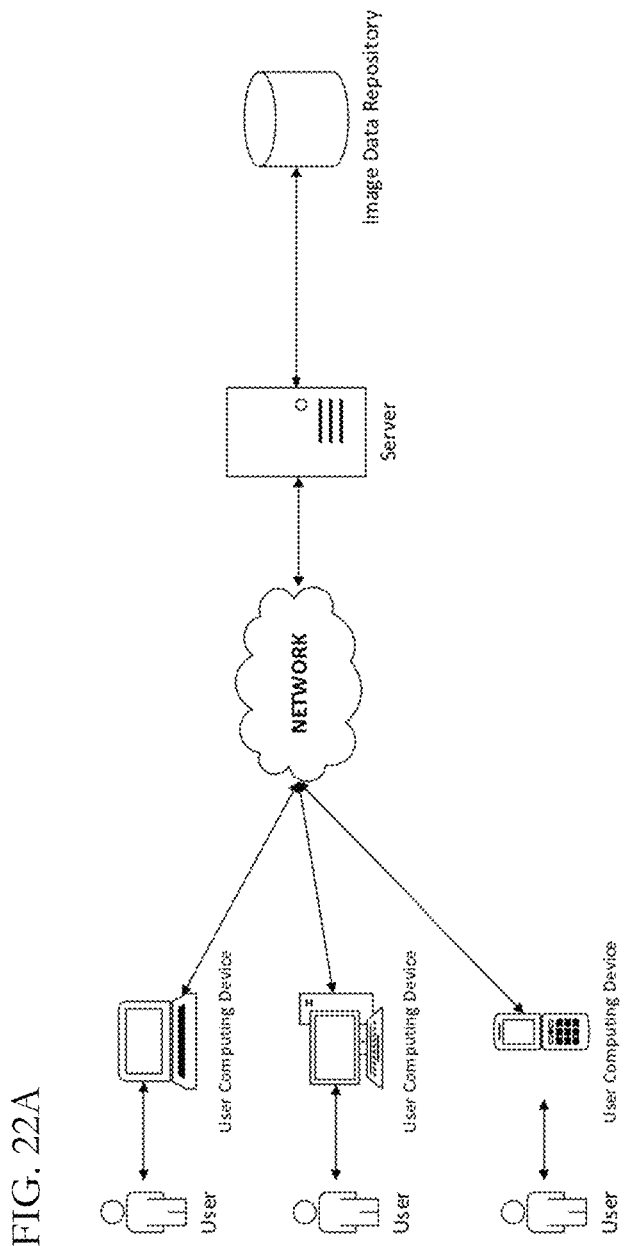
FIG. 22A is an illustration of a system in accordance with an embodiment of the invention.

For example, in the embodiment of FIG. 22A, users upload image files to a server using a network connection, and the image files are stored in a separate image repository (e.g. a database, server, computing system, etc.). Alternatively, the image repository may also reside on the server itself. In addition, the internet is not required for storing images, but may be used to do so.

Figure 22B:
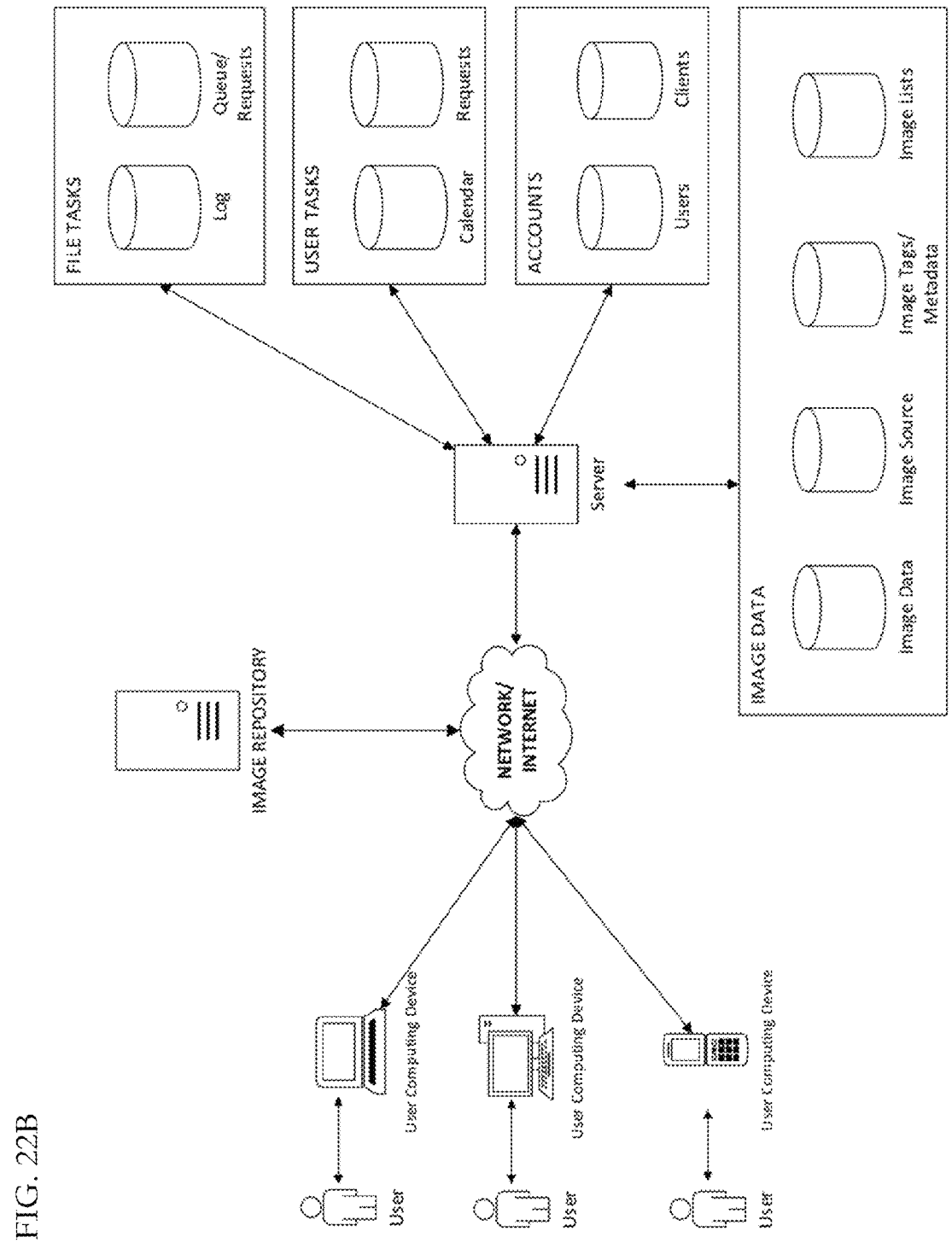
FIG. 22B is an illustration of a system in accordance with an embodiment of the invention.

FIG. 22B illustrates another embodiment of the invention, which stores information associated with each file on multiple data storage systems. The image repository is accessed by the server using the Internet or network connection whereas the other components and features of the system can be accessed directly without using the Internet (e.g. intranet connections, direct connections to other servers, storage on the server, etc).

The examples provided are merely exemplary, as a matter of application specific to design choice, and should not be construed to limit the scope of the invention in any way. For example, the processing device may be the imaging device, wherein the automatic naming of the image files and/or associating Tagging Data thereto is executed within the imaging device, rather than an external processing device. Additionally, the processing device preferably includes a display via which the names of the image files can be viewed. Preferably, the image files can also be viewed, permitting the user to confirm that the image files are named correctly.

Thus, while there have been shown and described and pointed out novel features of the invention as applied to preferred embodiments thereof, it will be understood that various omissions and substitutions and changes in the form and details of the disclosed invention may be made by those skilled in the art without departing from the spirit of the invention. For example, an additional digital image file, referred to herein as a "End Tagging Image" may be captured by the imaging device after a series of images have been captured to indicate the end of the series of images. Similar to the Tagging Image, the End Tagging Image may be a photograph taken of a document having information regarding the related images or an image generated by the imaging device based on text inputted into the imaging device. Alternatively, the End Tagging Image may be of a specific image, text, symbol, etc. Furthermore, the End Tagging Image need not be an image file. By way of non-limiting example, the End Tagging Image may be a text file. In accordance with an embodiment, for example, wherein the image files are contained in a large storage unit, a database may be utilized to identify the last known image catalogued by the system, which may reduce the time and computing required. A database may also be used to catalog the default file name and the new file name for future reference.

In addition, Tagging Images may be identified and marked by the user using the software or hardware of the image capture device. This reduces the number of images that is processed by the computing system and limits the number of files that must be processed for text, barcode, QR code recognition. For instance, a user may capture an image of the tagging text using a digital image device and then mark the image as a tagging image by pushing a button (intended to mark tagging images) or by selecting an option on the device operating system.

Other alterations can be made without deviating from the scope of the invention. Accordingly, the system and method, the use, steps, order of steps, etc. may be varied as a matter of application specific design choice without deviating from the scope of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall there between.

We claim:

1. A system for associating data to image files, the system comprising:
   a file receiving device configured to receive one or more of image files from an imaging mechanism;
   a storage medium configured to store one or more of said image files; and
   a processing mechanism configured to
   identify, among said image files received by the file receiving device, one or more tagging image files by recognizing text in said one or more tagging image files, wherein said text comprises data for a set of image files;
   extract said data from the text;
   associate said data to said set of image files; and
   save said set of image files having said data associated therewith onto the storage medium;
   wherein the processing mechanism
   identifies a first tagging image having a first data and a second tagging image having a second data, wherein the set of image files is preceded by the first tagging image and followed by the second tagging image; and
   associates the first data and the second data to the set of image files.

2. The system of claim 1, further comprising an imaging device configured to capture one or more images into said one or more image files.

3. The system of claim 1, wherein the processing mechanism names said image files based on said data.

4. The system of claim 1, wherein the processing mechanism is automated.

5. The system of claim 1, further comprising a display for displaying the contents of the storage device.

6. The system of claim 1, wherein the processing mechanism changes the names of the set of image files from one or more initial file names retrieved by the receiving device into new file names based on said data.

7. The system of claim 1, wherein the set of image files is a series of consecutive image files.

8. The system of claim 1, wherein the processing mechanism is further configured to identify a series of image files between two tagging image files.

9. The system of claim 1, comprising a computer or a mobile and internet/hard drive enabled device.

10. The system of claim 1, comprising an Internet-capable device.

11. The system of claim 1, comprising a user interface configured to permit a user to provide instructions for naming the image files.

12. A method of associating data to digital image files, the method comprising:
    receiving on a receiving device, one or more digital image files;
    identifying, among said digital image files received by the receiving device, one or more tagging image files by recognizing text in said one or more tagging image files, wherein said text comprises data for a set of image files;
    extracting said data from the text;
    associating said data to said set of image files; and
    saving said set of image files having said data associated therewith;
    identifying a first tagging image having a first data and a second tagging image having a second data, wherein the set of image files is preceded by the first tagging image and followed by the second tagging image;
    extracting said first data and said second data; and associating the first data and the second data to the set of image files.

13. The method of claim 12, wherein associating said first data and second data to the set of image files includes naming the one or more digital image files within said set of image files.

14. The method of claim 12, further comprising capturing an image of text.

15. The method of claim 12, further comprising receiving a naming convention from a user.

16. The method of claim 12, further comprising saving the set of image files to a storage medium after naming said one or more digital image files within said set of image files.

\* \* \* \* \*